US007050765B2

(12) United States Patent
Ammar et al.

(10) Patent No.: US 7,050,765 B2
(45) Date of Patent: May 23, 2006

(54) HIGHLY INTEGRATED MICROWAVE OUTDOOR UNIT (ODU)

(75) Inventors: Danny F. Ammar, Windermere, FL (US); David Bass, Winter Springs, FL (US); Gavin Clark, Tavares, FL (US); Ronald D. Graham, Clermont, FL (US); Conrad Jordan, Clermont, FL (US); Stephen A. Stahly, Orlando, FL (US)

(73) Assignee: Xytrans, Inc., Orlando, FL (US)

(*) Notice: Subject to any disclaimer, the term of this patent is extended or adjusted under 35 U.S.C. 154(b) by 498 days.

(21) Appl. No.: 10/338,773

(22) Filed: Jan. 8, 2003

(65) Prior Publication Data

US 2004/0203528 A1 Oct. 14, 2004

(51) Int. Cl.
*H04B 1/38* (2006.01)

(52) U.S. Cl. ........................ 455/90.3; 455/82; 455/84; 343/772

(58) Field of Classification Search ............ 455/562.1, 455/560, 575.7, 90.2, 90.3, 13.1; 343/702, 343/772

See application file for complete search history.

(56) References Cited

U.S. PATENT DOCUMENTS

| | | | | |
|---|---|---|---|---|
| 4,884,208 | A | 11/1989 | Marinelli et al. | 364/460 |
| 5,511,079 | A | 4/1996 | Dillon | 371/43 |
| 5,563,618 | A | 10/1996 | Tamura | 343/786 |
| 5,671,220 | A | 9/1997 | Tonomura | 370/281 |
| 5,760,749 | A * | 6/1998 | Minowa et al. | 343/772 |
| 5,828,339 | A | 10/1998 | Patel | 343/700 |
| 5,967,800 | A | 10/1999 | Bishop | 439/74 |
| 6,072,991 | A * | 6/2000 | Paul et al. | 455/73 |
| 6,204,822 | B1 | 3/2001 | Cardiasmenos et al. | 343/761 |
| 6,212,360 | B1 | 4/2001 | Fleming, III et al. | 455/13.4 |
| 6,295,036 | B1 | 9/2001 | Mata et al. | 343/878 |
| 6,366,244 | B1 * | 4/2002 | Fernandes | 343/700 MS |
| 6,366,620 | B1 | 4/2002 | Jackson et al. | 375/308 |
| 2001/0013133 | A1 | 8/2001 | Harrison | 725/121 |
| 2002/0049919 | A1 | 4/2002 | Jansen | 713/300 |
| 2002/0065052 | A1 * | 5/2002 | Pande et al. | 455/67.5 |

(Continued)

FOREIGN PATENT DOCUMENTS

EP 0 231 422 8/1987

(Continued)

*Primary Examiner*—Tilahun Gesesse
(74) *Attorney, Agent, or Firm*—Allen, Dyer, Doppelt, Milbrath & Gilchrist, P.A.

(57) ABSTRACT

A lightweight millimeter wave outdoor unit includes a lightweight housing with a heat sink and mounting member configured for mounting on the antenna to form a wireless link. A millimeter wave transceiver board is formed of ceramic material and mounted within the housing. It includes a millimeter wave transceiver circuit that has microwave monolithic integrated circuit (MMIC) chips and operable with the transmit and receive boards. An intermediate frequency (IF) board has components forming an intermediate frequency circuit operable with the millimeter wave transceiver circuit. A frequency synthesizer board has a signal generating circuit for generating local oscillator signals to the transceiver circuit. A controller board has surface mounted DC and low frequency discrete devices thereon forming power and control circuits that supply respective power and control signals to other circuits on other boards. A quick connect/disconnect assembly is operative with the housing for allowing the housing to be rapidly connected and disconnected to the antenna circuit contact members interconnect circuits between boards.

28 Claims, 14 Drawing Sheets

U.S. PATENT DOCUMENTS

| | | | | |
|---|---|---|---|---|
| 2002/0086655 | A1 | 7/2002 | Ammar et al. | 455/347 |
| 2002/0098803 | A1 | 7/2002 | Poulton et al. | 455/13.1 |
| 2002/0102948 | A1 | 8/2002 | Stanwood et al. | 455/91 |
| 2002/0144392 | A1 | 10/2002 | John et al. | 29/600 |
| 2004/0203337 | A1* | 10/2004 | Ammar | 455/3.02 |

FOREIGN PATENT DOCUMENTS

| | | |
|---|---|---|
| EP | 1 175 111 | 1/2002 |
| WO | 99/03302 | 1/1999 |
| WO | 99/04534 | 1/1999 |
| WO | 02/067549 | 8/2002 |

* cited by examiner

HIGHLY INTEGRATED MICROWAVE OUTDOOR UNIT (ODU)

FIELD OF THE INVENTION

This invention relates to the field of wireless outdoor units, and more particularly, this invention relates to the field of millimeter wave, wireless terrestrial outdoor units that use microwave monolithic integrated circuits (MMIC).

BACKGROUND OF THE INVENTION

The increased demand for high-speed, high data rate communications has created an immediate need for broadband access to the related network infrastructure. New applications include computer-to-computer communications, gaming, and video-based services. Wireless solutions offer benefits in ease of deployment without the requirement of destroying streets to lay fiber. Wireless solutions also offer increased flexibility because new communication links can be added to the network as customers are added. Wireless solutions are also less expensive compared to optical fiber and hardwired solutions.

The use of millimeter wave (MMW) frequency bands allows wireless links to produce up to about an estimated one thousand times the data capacity of digital subscriber loop (DSL) or cable modem, systems, and offer a higher bandwidth than available at lower operating frequencies. Currently, many terrestrial wireless systems are built using point-to-point, point-to-multipoint, Local Multipoint Distribution Services (LMDS) and mesh architectures. Each link end contains an indoor unit (IDU) and an outdoor unit (ODU). The indoor unit usually has a modem and a power supply. The outdoor unit, which represents about 60% of the cost of the link, typically contains a number of subassemblies, such as a millimeter wave transmitter and receiver or an integrated transceiver, a frequency source, such as a frequency synthesizer circuit, a power supply, a controller, and monitoring circuits.

Different vendors usually manufacture these subassemblies. An outdoor unit is manufactured by mounting the subassemblies inside a large housing and connecting the subassemblies with cables and wire harnesses. The outdoor unit is tested and its operational character based on temperature changes is performed, which often takes hours to complete.

This method of fabricating and testing outdoor units is expensive, requires much manual labor, and results in low operational reliability.

FIG. 1 illustrates a typical prior art wireless, outdoor unit 30 used in terrestrial communication. As illustrated, this prior art outdoor unit 30 has a number of subassemblies that are functionally separate from each other and require individual testing and careful selection and manufacture to form the wireless terrestrial outdoor unit 30. A housing enclosure 31 supports a circuit or other mounting board 32 on which are mounted a millimeter wave (MMW) transmitter 33, a millimeter wave (MMW) receiver 34, and a large frequency synthesizer 35. An intermediate frequency (IF) processor circuit can be separate or part of other circuits and is operative for controlling operation of the frequency synthesizer, transmitter, and receiver. A power supply 36 provides the necessary power to the transmitter, receiver, and synthesizer. A waveguide filter 37 provides proper signal filtering for operation.

In this type of prior art outdoor unit 30, the various subassemblies are connected using expensive wiring harnesses and coaxial cables 38, as illustrated. Also, as noted before, different commercial vendors manufacture different subassemblies. The radio manufacturer buys these subassemblies from the different vendors, tests individual subassemblies before assembly, assembles the subassemblies into an outdoor unit, and tests the outdoor unit after assembly. The outdoor unit 30 is tested and characterized over temperature usually in large environmental chambers. This type of outdoor unit usually weighs over 20 pounds, and often costs between about $5,000 and about $10,000 in present day economic terms, depending on the desired performance and end use.

SUMMARY OF THE INVENTION

It is therefore an object of the present invention to provide an outdoor unit that overcomes the disadvantages as noted above.

The present invention advantageously reduces the size and cost of a conventional, broadband outdoor unit used in high speed and high data rate wireless communications. The present invention has a reduced size of the outdoor unit and easily integrates the outdoor unit into existing hardware components of communication systems, such as by mounting the outdoor unit on an existing antenna. It can be easily integrated into tower installations and has reduced costs and allows network service providers to offer consumers a more affordable service.

The millimeter wave outdoor unit is adapted for mounting on an antenna and has a housing with a heat sink and a mounting member that is configured for mounting on the antenna. The mounting member includes transmit and receive waveguide ports. A millimeter wave transceiver board is formed of a ceramic material and mounted within the housing and has a millimeter wave transceiver circuit, including microwave monolithic integrated circuit (MMIC) chips and operable with the transmit and receive ports.

An intermediate frequency (IF) board is mounted in the housing and has components forming an intermediate frequency circuit operable with the millimeter wave transceiver circuit. A frequency synthesizer board is mounted within the housing. A controller board is mounted within the housing and has surface mounted DC and low frequency discrete devices thereon forming power and control circuits that supply respective power and control signals to other circuits on other boards. Circuit contact members interconnect the circuits between boards, wherein the use of cables and wiring harnesses is minimized. A quick connect/disconnect assembly is operative with the housing for allowing the housing to be rapidly connected and disconnected to the antenna.

In one aspect of the present invention, the quick connect/disconnect assembly comprises snap fasteners. Housing separator members can separate the respective transceiver and controller boards and have channelization and at least one electromagnetic interference gasket to aid in isolating any circuits on a board. The intermediate frequency circuit is operable to receive low frequency transmitter signals from a modem in the indoor unit and up-convert the signals to an intermediate frequency and amplify the signal. It also receives an intermediate frequency signal from the millimeter wave transceiver board and down-converts to a lower frequency prior to transmission to an indoor unit.

In yet another aspect of the present invention, a transmit and receive microstrip-to-waveguide transition is formed on the millimeter wave transceiver board and operable with the respective transmit and receive waveguide ports. The housing member further comprises a cover on which the waveguide ports are formed. A frequency synthesizer board is mounted in a floating non-mechanically attaching interface allowing relative movement and coefficient of thermal expansion mismatch and reduced phase hits. The controller board is mounted to engage the heat sink.

In yet another aspect of the present invention, the millimeter wave transceiver board is mounted adjacent and planar end-to-end with the intermediate frequency board. Circuit connecting members can interconnect circuits on the respective boards and each can comprise a housing member having a clip receiving slot and board engaging surface and at least one electrically conducted clip member having opposing ends received within the clip receiving slot. An end of the clip member is secured to a circuit on one board and the other end biased into connection with a circuit on another board. A microcontroller can be mounted on the controller board and operatively connected to at least one MMIC chip and operative for controlling transceiver gain and output power. This microcontroller can be responsive to sensed temperature. A transceiver board can be operable at select frequency bands and readily removable from the housing to allow replacement with a transceiver board that is operable at different frequency bands. The controller board is formed from PTFE composite material.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously reduces the size and cost of a conventional, broadband outdoor unit used in high speed and high data rate wireless communications. The present invention is advantageous over digital subscriber line (DSL), cable modem, or similar communications systems, and can be used in point-to-point, point-to-multipoint, Local Multipoint Distribution Service (LMDS), and mesh communication architectures. The present invention reduces the size of the outdoor unit, and more easily integrates the outdoor unit into existing hardware components of communications systems, such as by mounting the outdoor unit on an existing antenna. The outdoor unit of the present invention can also be easily integrated into tower installations. The reduction in the costs for the overall outdoor unit also allows network service providers to offer consumers a more affordable service.

The present invention advantageously provides a lightweight, highly integrated, low cost, compact outdoor unit that limits the use of wiring harnesses and connector cables. The outdoor unit of the present invention includes a dynamic thermal management system that allows the outdoor unit to remain at a safe temperature, adding reliability to the electronics, even though the outdoor unit has a small overall size. A modular design for the outdoor unit of the present invention also enables a single platform use for a wide frequency range. The outdoor unit can also incorporate a universal standard interface with an antenna that allows for quick connect and disconnect of the outdoor unit from an antenna.

Figure 1:
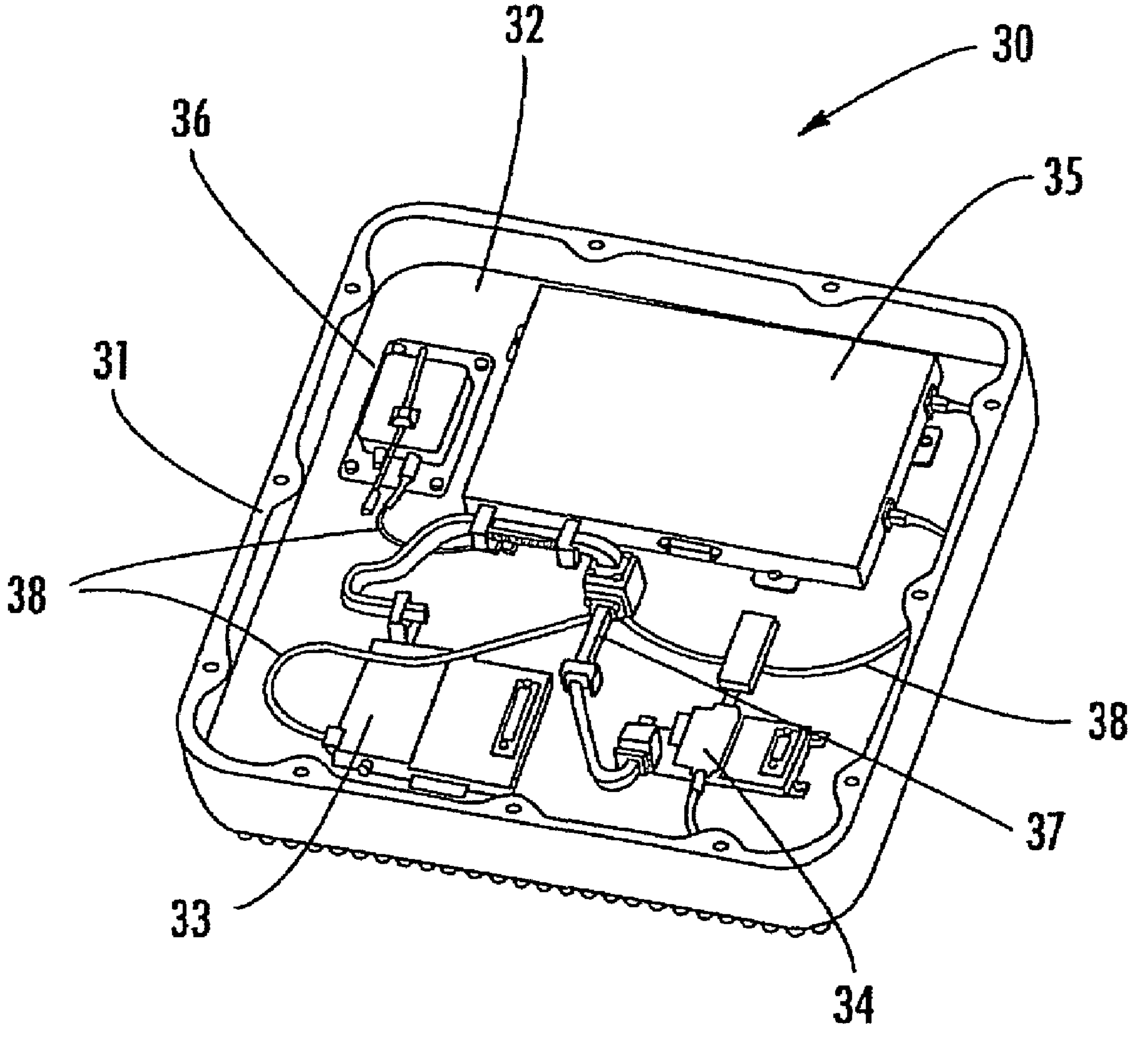
FIG. 1 (PRIOR ART)
FIG. 1 is an isometric drawing of a prior art terrestrial outdoor unit.
Figure 2:
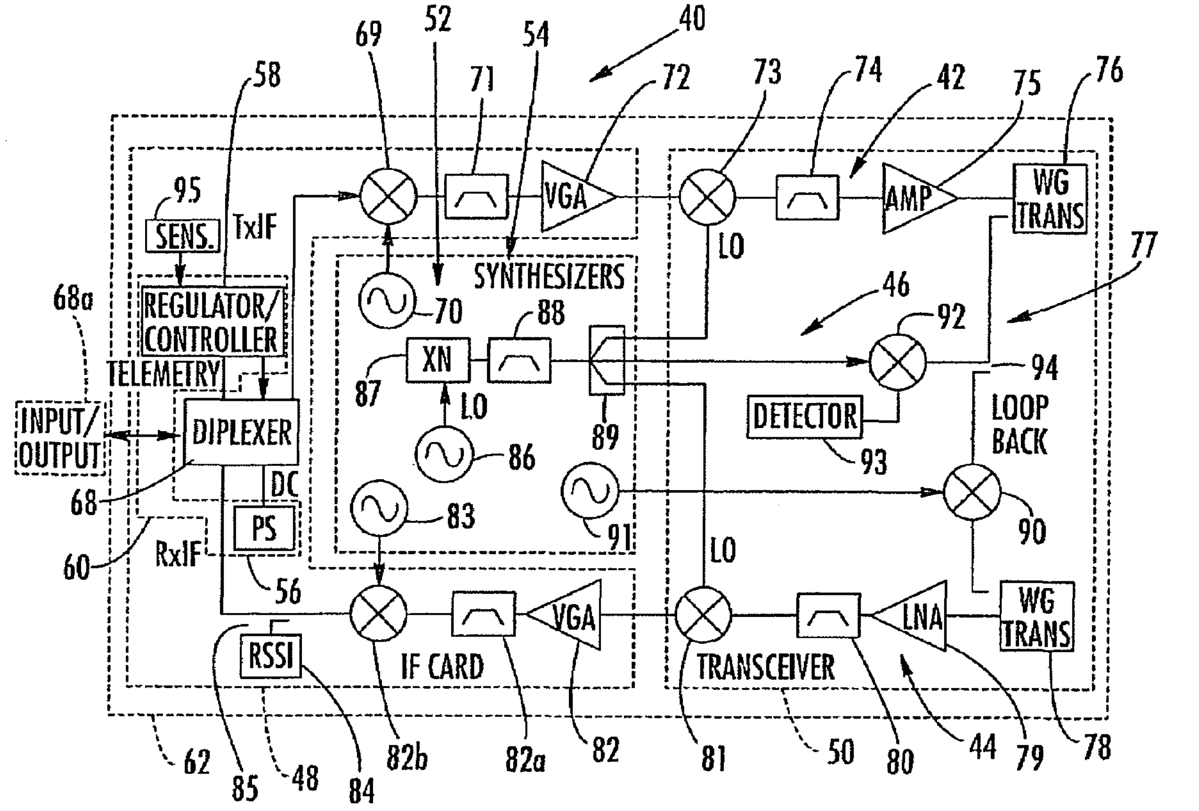
FIG. 2 is a block diagram of an outdoor unit of the present invention that can be used for millimeter wave frequencies.

FIG. 2 is a high level block diagram showing basic components of the outdoor unit 40 of the present invention. The outdoor unit 40 of the present invention includes a transmitter circuit chain 42, receiver circuit chain 44, and local oscillator circuit chain 46 as illustrated. A portion of an intermediate frequency circuit that forms part of the transmitter and receiver circuit chains 42,44 is typically mounted on an intermediate frequency (IF) board (or card) 48. A millimeter wave transceiver circuit includes parts of transmitter, receiver and local oscillator circuit chains 42, 44, 46, and is mounted on a millimeter wave (RF) transceiver board (or card) 50 that is edge coupled to the intermediate frequency (IF) board (or card) 48. A frequency synthesizer circuit 52 is mounted on a frequency synthesizer board (or card) 54. A power supply circuit 56 can be mounted, together with a regulator/controller circuit 58 having a microprocessor or other microcontroller circuitry mounted on a power supply/controller board (or card) 60.

Figure 4:
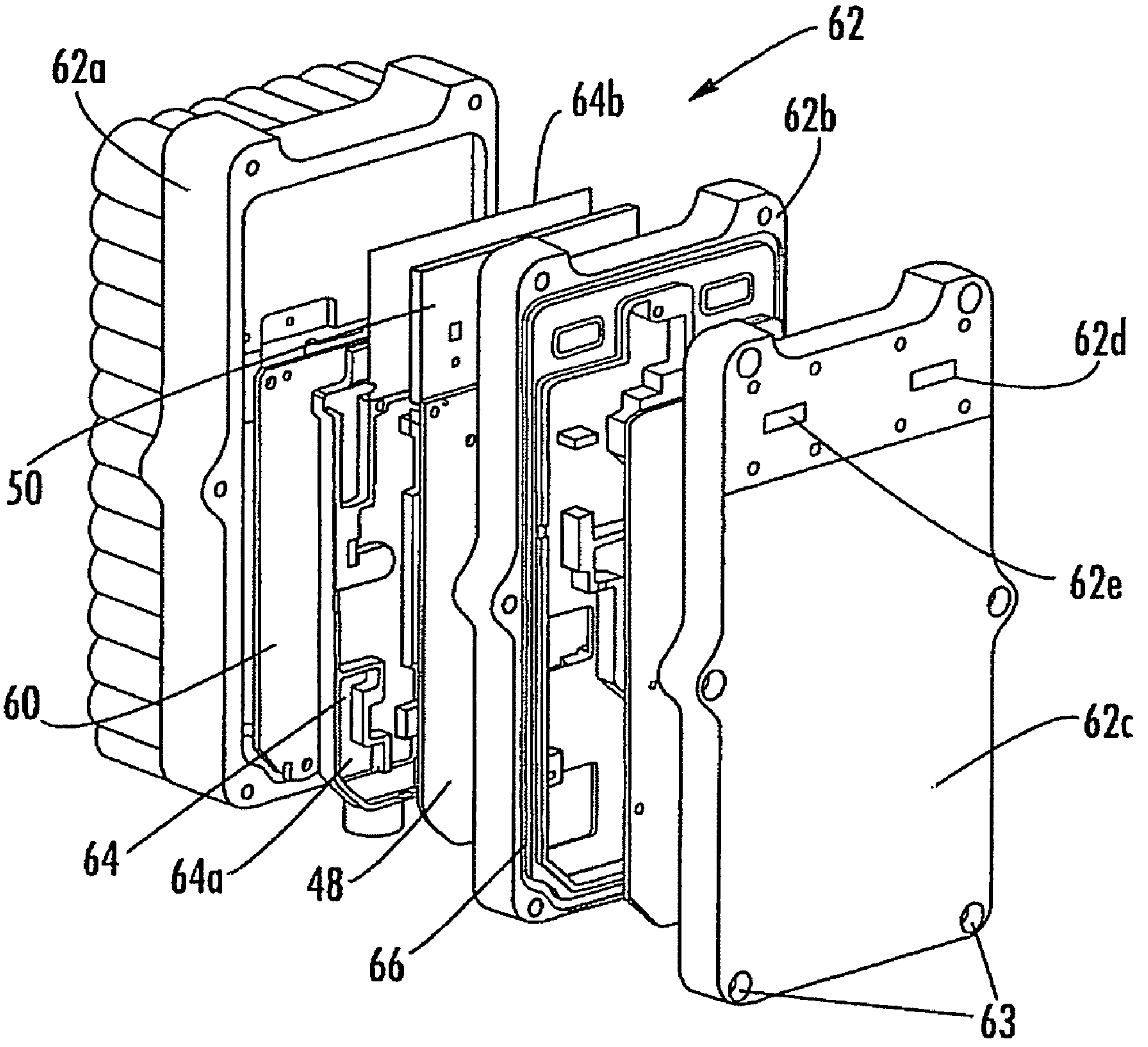
FIG. 4 is an exploded, isometric view of the housing assembly and showing an example of the board orientation relative to plates as separator plates and sections of the housing assembly.

A housing assembly 62 mounts the various boards for functional interoperation, such as shown in FIG. 4, where a combination main housing and heat sink member 62*a*, housing mid-section 62*b* (as housing separator member), and cover 62*c* form major components of the housing assembly. These components can be formed from aluminum or other similar material. The transceiver (radio frequency) board 50 and edge connected intermediate frequency board 48 are separated from the power supply/controller board 60 by a separator plate 64 having formed channelization 64*a*. The intermediate frequency board 48 and edge connected transceiver board 50 are mounted against the housing mid-section 62*b* and separated from the frequency synthesizer board 52 by the housing mid-section 62*b*, which includes an EMI gasket 66. The separator plate 64 has an extension piece 64*b* that protects the transceiver board 50, which also is readily removable from the housing and from edge connection to the intermediate frequency board. The frequency synthesizer board 52 is mounted against the opposing side of the housing mid-section 62*b* adjacent the cover 62*c*. The housing assembly 62 includes fasteners that are inserted into appropriate fastener locations 63 for holding the various sections together when assembled. Transmit and receive waveguide ports 62*d*, 62*e* are positioned in the cover 62*c* for transmitting and receiving respective wireless signals.

The block diagram of FIG. 2 illustrates basic circuit components where the low frequency transmitter signal would be received from a modem in the indoor unit (IDU) and into a diplexer 68 through an input/output port 68*a*. From the diplexer 68, signals can pass along the transmitter circuit chain 42 and be up-converted to an intermediate frequency (IF) and amplified. As illustrated, the signal from the diplexer is passed into a mixer 69 where the signal is mixed with a local oscillator signal generated from a local oscillator 70 as part of the frequency synthesizer circuit 52 to form the proper intermediate frequency. A bandpass filter 71 eliminates certain spurious signals and frequencies by appropriate filtering. A variable gain amplifier 72 (which can be microcontrolled) provides additional gain for the signal that is transmitted along the transmitter circuit chain 42 to components on the transceiver board. The signal from the variable gain amplifier 72 is mixed at a mixer 73 with another local oscillator signal to form the desired transmission frequency. A bandpass filter 74 filters unwanted and spurious signals. A transmit high gain amplifier 75 further amplifies the signal for transmission. The waveguide transition 76 allows signal conversion for transmission and also permits a signal loop for analysis via a loop back circuit 77.

On the receiver side, a waveguide transition 78 receives signals and forwards signals to a low noise amplifier 79 and bandpass filter 80 into a mixer 81 where the signal is mixed with a local oscillator signal generated from the frequency synthesizer circuit 52 to form an appropriate intermediate frequency along the receiver circuit chain 44. This intermediate frequency signal is fed to the IF board 48 having a variable gain amplifier 82. The signal passes into a bandpass filter 82*a* and mixer 82*b* where the signal is mixed with a local oscillator signal generated from a local oscillator 83 as part of the frequency synthesizer circuit. After mixing, the signal is forwarded to the diplexer where it is sent to the indoor unit (not illustrated) via input/output port 68*a*. A receive signal strength indicator circuit 84 is coupled by coupler 85 for receiving a small portion of the receive signal and determining the strength of the received signal.

The frequency synthesizer circuit 52 generates all required local oscillator signals using a voltage controlled oscillator circuit, which can be phase locked to a crystal oscillator. The circuit 52 includes a main oscillator circuit 86 that forwards local oscillator signals to a multiplexer circuit 87 and bandpass filter 88 for rejecting unwanted and spurious signals. A splitter 89 permits splitting of signals to the respective transmitter or receiver circuit chains 42, 44.

The outdoor unit is preferably connected to the indoor unit via a single coaxial cable, in a preferred aspect of the present invention, can use a telemetry system using ON/OFF keying that is transferred on the same cable. The diplexer circuit 68 separates intermediate frequency signals on the receiver circuit chain 44 and transmitter circuit chain 42, DC signals, and control and command tones, which are all frequency multiplexed on the same coaxial cable, as will be explained in greater detail below. The power supply circuit 56 converts high voltage DC signals such as greater than 24 volts DC to the desired lower level DC signals that are required to operate the amplifiers and any control circuits. The frequency synthesizer circuit 52 and the various oscillator circuits as illustrated, include the main local oscillator circuit 86 that forwards the generated local oscillator signal to the multiplier circuit 87, through the bandpass filter 88 and into the splitter 89.

The regulator/controller circuit 58 can include a microcontroller, such as a microprocessor, that provides control and monitor (C&M) functions and interfaces with the indoor unit. The microcontroller circuit allows a "smart" transceiver function that has enhanced circuit function using a microcontroller operation. The receiver circuit chain 44 and transmitter circuit chain 42 can be operable at intermediate frequencies on the intermediate frequency (IF) board (or card) 48. Components forming these circuits are typically positioned on a ceramic substrate board, for example, ceramic material, such as 95% or 96% alumina, and are operable at predetermined intermediate frequencies $X_{IF}$ that are forwarded and received to indoor units. The transceiver (RF) board can also be similarly formed and edge connected as illustrated in FIG. 4.

Any amplifiers as described can typically be formed as microwave monolithic integrated circuit (MMIC) chips. Gain control signals from a microcontroller in the regulator/controller circuit 58 could control gain in any of the variable gain amplifiers. The received signal strength circuit 84 can determine signal strength and generate RSS signals to the microcontroller indicative of the received signal strength. Naturally, inputs can also be received into the microcontroller from various sensors, including a temperature sensor as further explained below, and/or from user input, and/or from predefined standard control signals. The microcontroller could output gain control signals and amplifier gate bias signals.

As noted before, as shown in FIG. 2, the outdoor unit also includes a signal loop back circuit 77 operative with the transmitter circuit chain 42, receiver circuit chain 44, and local oscillator circuit chain 46. The signal loop back circuit 77 includes a mixer 90 and oscillator 91 (part of the frequency synthesizer circuit 52). The generated oscillator signal is mixed at the mixer 90 with received signals from the waveguide transition 78 and coupled to another output in the local oscillator circuit chain 46. The transceiver board (or card) includes a mixer 92 and detector circuit 93 as part of the signal loop back circuit 77 for detecting transmitter signals, which are also coupled by coupler 94 to mixer 90. Signals from the detector circuit 90 can also be forwarded to the microcontroller for analysis and aiding in controlling transceiver functions. This overall circuit can be operable at various frequencies, including Ka-band. It should be understood that local oscillator (LO) signals can be generated by multiplying the output of an oscillator as an x-band (9–10 GHz) low cost dielectric resonator oscillator (DRO) (free running or phase locked) or a multiplied-up VCO. Signals from sensor circuits 95, such as temperature or voltage, can be forwarded to the regulator/controller 58 for analysis and changing transistor bias and other conditions and changing operation of the overall unit.

The microcontroller is preferably incorporated into the regulator/controller circuit and preferably a microprocessor circuit that is also surface mounted on the controller board 60. This type of board can be formed as a separate "soft" or controller board, which as noted before, can also include the power supply in some cases. These and other lower frequency components can be mounted on the "soft" board, i.e., the controller board, as compared to a ceramic bard for higher frequency components. The microcontroller provides the control and monitoring functions and interfaces with the indoor unit. The microcontroller can also provide the logic intelligence "smarts" required to control individual MMIC chips in the unit, such as using a circuit function described in commonly assigned U.S. patent application Ser. No. 09/863,052, entitled "SELF-TUNED MILLIMETER WAVE RF TRANSCEIVER MODULE," the disclosure which is hereby incorporated by reference in its entirety.

In order to reduce phase hits, which are typically caused by having different rates of expansion at the housing assembly (and its components) and printed wiring board material versus temperature, the frequency synthesizer board 54 is not attached to the housing assembly with any fasteners. It is allowed to float between the housing cover and having mid-section **62*b*** formed as a separator plate or member. The EMI gaskets on the housing cover and separator plates can be used to hold the board in place and provide required isolation between the circuits to reduce space hits. Such an advantageous "floating" design is disclosed in commonly assigned U.S. Pat. No. 6,498,551 entitled, "MILLIMETER WAVE MODULE (MMW) FOR MICROWAVE MONOLITHIC INTEGRATED CIRCUIT (MMIC), the disclosure which is hereby incorporated by reference in its entirety.

Figure 3:
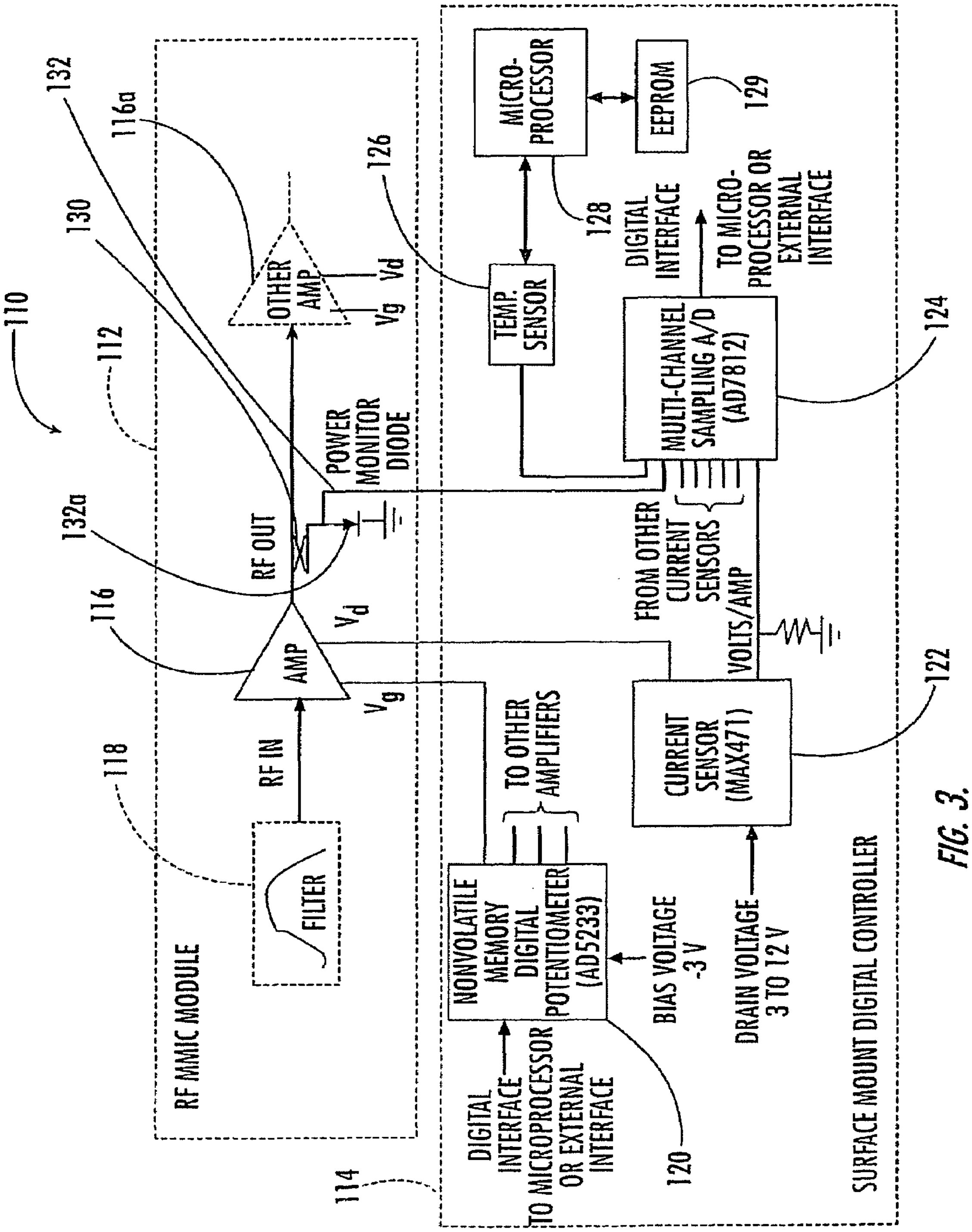
FIG. 3 is a block diagram of an example of a self-tuned, millimeter wave transceiver microcontroller circuit that could be modified for use with the outdoor unit of FIG. 2, and provide the enhanced circuit function of the present invention.

One non-limiting example of a microcontroller circuit 110 that can be modified for use by the present invention for controlling MMIC chips and self-biasing is described below with reference to FIG. 3. Naturally, other circuits could be designed. The circuit operation described below with reference to FIG. 3 gives only one example of the type of microcontroller circuit that can be used in the present invention and the function that can be accomplished. FIG. 3 illustrates an example of a low cost circuit that can be used and is explained for purposes of describing the microcontroller function that can be used with the present invention. The entire circuit can be implemented using low cost commercial off-the-shelf (COTS) surface mount chips.

A self-tuned millimeter wave transceiver module 110 is shown. The module 110 includes a radio frequency MMIC chip formed as a module and illustrated by the dashed lines at 112 and a surface mounted digital microcontroller, indicated by the dashed lines at 114.

The MMIC module includes a plurality of amplifiers, as is typical with a MMIC chip, but only illustrates one amplifier 116 for purposes of description. The radio frequency signal enters and passes through a filter 118 and into the amplifier 118 having the normal gate, source and drain. The radio frequency signal passes from the amplifier 116 into other amplifiers **116*a* (if present). The MMIC chip 112 can include a large number of amplifiers 116 on one chip. The surface mounted digital controller 114 includes a digital potentiometer 120 having a nonvolatile memory circuit. An example of a potentiometer includes an AD5233 circuit. The potentiometer 120** can handle a bias voltage of about −3 volts.

A current sensor 122, such as a MAX471 with a drain voltage of 3–12 volts, is coupled to ground and to the amplifier 116 through the drain. The current sensor 122 is connected to a multi-channel sampling, analog/digital circuit 124, such as an AD7812 circuit. Other current sensors connect to other amplifiers (not shown) and connect to the multi-channel A/D circuit 124. A temperature sensor 126 is connected to the multi-channel sampling A/D circuit and is operative for measuring the temperature of the MMIC module. A microprocessor 128 is included as part of the surface mounted digital controller, and operatively connected to an EEPROM 129 and other components, including the multi-channel sampling A/D circuit 124 and the nonvolatile memory digital potentiometer 120. As shown, the potentiometer 120 is connected to other amplifiers on the MMIC and can step gate voltage for respective amplifiers and provide individual control.

As also illustrated, the radio frequency signal from the amplifier 116 can pass from the passive coupler 130 to a power monitor diode or other detector circuit 132 connected to ground. This connection from the passive coupler 130 can be forwarded to the multi-channel sampling A/D circuit 124.

The circuit can adjust automatically the amplifier gate voltage (Vg) until the amplifier 116 reaches its optimum operating condition as measured by the amount of current drawn by the drain (Id), and as measured by the detector circuit 132 at the output of the amplifier (if available). This is achieved by controlling (through a serial digital interface) the digital-to-analog (D/A) converter output voltage generated from potentiometer 120. The D/A converter includes a nonvolatile memory and is currently available with four channels for less than about $3.00 at the current time.

As the gate voltage is varied, the current sensor 122 provides a voltage output that is proportional to the drain current drawn by the amplifier 116. The current sensor output is digitized by the multi-channel serial analog-to-digital converter (A/D) 124 that digitizes the drain current level. The current level word is compared to a pre-stored optimum amplifier drain current level, such as contained in the EEPROM 129. The gate bias level is adjusted until the optimum drain current is reached. The detector circuit, which is available either on a MMIC chip or could be added externally, provides a confirmation that the drain current setting is at the optimum level by measuring the output power. The detector output 132 is compared to a pre-stored value that defines the expected nominal value at the output of the amplifier.

The drain current adjustment, the current sensing and detector output measurements can be implemented in a real-time continuous adjustment mode by using low cost microprocessor or through a one-time setting that is accomplished during module test. The EEPROM 129 can be used to store preset chip characteristics, such as optimum drain current and expected output at various stages in the RF circuit.

The current measurement sensor 122 also allows for diagnostics of each amplifier in the circuit. The current measurement circuit will sense any unexpected drop or increase in current draw. By monitoring the temperature sensor 126, the microprocessor 128 determines whether a change in current (Id) is caused by a temperature change or malfunction. The status of each amplifier 116 is reported via the digital serial interface.

In cases where DC power dissipation is a prime concern because of thermal issues, any amplifiers 116 can be adjusted via the gate bias control such that the amplifiers draw minimal current. A user may select a maximum temperature, and the microprocessor will maintain the transceiver at or below that temperature by controlling the DC power dissipation in the MMIC chips.

Traditional methods of controlling gain and output power in RF modules has been to use active attenuators in the transmitter circuit chain. This is inefficient because any amplifiers in the chain will dissipate power. By using the digital potentiometer 120, the gain and output power of each amplifier can be controlled individually or in groups. The present invention allows the module to have infinite control over gain and output power, without adding active attenuators after each amplifier, thus, reducing cost and eliminating unnecessary DC power dissipation.

RF power sensing can be achieved through the power monitor diode and detector circuit 132 by coupling some of the amplifier output power (15 to 20 dB) into the passive coupler 130. The output of the coupler is sensed by a diode 132*a*. The output of the diode 132*a* is amplified and digitized via the serial A/D converter.

The digital potentiometer 120, current sensor 122 for each amplifier, and the temperature sensor 126 allows the module to self adjust its gain as a function of temperature changes. This is accomplished by maintaining the preset current draw from each amplifier constant as the module temperature changes. With the present invention, the module gain and output power can be controlled with high precision.

A user's ability to program the module gain at any stage in the transmitter, receiver (even local oscillator) circuit chain provides the flexibility to trade-off key performance parameters, such as transmitter noise figure (NF) versus intermodulation level (IM), without changing the circuit design. Real-time individual chip control also allows the user to operate in a desired condition, such as a linear mode for high modulation communications.

It should be understood that this described self-optimization technique can also be used on different devices with the MMIC chip, such as a mixer, multipliers, and an attenuator. By pinching off (maximum negative gate bias), all amplifiers in the transmit chain can be highly attenuated (over 50 dB) for safety reasons during installation. The present invention requires no additional switches or hardware.

The use of the microprocessor 128 and the chip control circuits as explained above allows the manufacturer to enable only those features that a customer desires for a particular application, such as the outdoor unit as described. Although the hardware can be identical, the features can be controlled by software. This allows flexibility of using the same module or board (or card), or other device in many different applications, including wireless point-to-point, point to multi-point, or even very small operative terminals. Additionally, the use of the microprocessor and a standard interfaces allows programmability and software upgrades (for additional features) of the device in the field without removing them.

The use of a microcontroller 114, the associated microprocessor 128, and onboard EEPROM 129 allow for correction and tuning of various functions. In this specifically described function, the corrections may include, but are not limited to (a) gain variation over temperature, (b) linearization of the power monitor circuit as a function of temperature and frequency, (c) gain equalization as a function of frequency, and (d) power attenuation linearization as a function of frequency and temperature. The use of the microprocessor 128 to control each of the active devices within a device, and the use of the EEPROM 129 to store correction factors, allow a high degree of flexibility and enables the module or other device to operate with high accuracy and performance. Module characterization data (gain, power, noise figure) are collected over temperature and frequency during testing. The correction factors are calculated automatically by a Test Station and stored in the EEPROM 129. The correction factors are used during normal module or other device operation to provide a desired performance.

The microcontroller in the present invention can sense various operating conditions, such as, but not limited to temperature, transmitter output power, transmitter gain, and receive signal strength (RSS). Based on these signals and optional information sent from the indoor unit, the microcontroller autonomously and continuously can adjust the transceiver gain and output power to maintain the desired performance over all temperature and weather conditions.

The microwave monolithic integrated circuit (MMIC) chips used on the transceiver (RF) board 50 can be mounted on a preferred ceramic board and mounted by traditional surface mount methods. A ceramic board could be used for millimeter wave (MMW) RF circuits, while the controller (soft) board 60 could mount the microcontroller and all DC and low frequency signal components. MMIC chips can be attached directly to a ceramic board by techniques such as described in commonly assigned U.S. patent application Ser. No. 10/091,382, entitled "MILLIMETER WAVE (MMW) RADIO FREQUENCY TRANSCEIVER MODULE AND METHOD OF FORMING SAME," the disclosure which is hereby incorporated by reference in its entirety.

The controller or "soft" board 60 could include various surface mounted components and related other circuit components, and could be operatively connected to various coaxial connectors and other contact connectors used to connect circuits between any "soft" board and ceramic board such as the controller board and transceiver board.

As shown in FIG. 4, the cover 62*c* includes transmit and receive waveguide ports 62*d*, 62*e* that operatively connect to various MMIC chips using various circuit connection structures and techniques. The controller or "soft" board 60 may include various surface mounted components and related circuit components and could be operatively connected to coaxial connectors and use contact connectors as will be described below to connect various circuits on the controller or "soft" board 60 with the ceramic board used for a transceiver RF board 50 and possibly intermediate frequency IF board 48.

The '382 application discloses an improvement over prior art "chip and wire" fabrication techniques that can be used with the present invention. A millimeter wave (MMW) radio frequency transceiver module includes a substrate board. A plurality of microwave monolithic integrated circuit (MMIC) chips are supported by the substrate board and, in one aspect, are arranged in a receiver section, a local oscillator section, and a transmitter section. A plurality of filters and radio frequency interconnects are formed on the substrate board and operative with and/or connect the receiver, local oscillator and transmitter sections. A plurality of electrical interconnects are operative with and/or connect the receiver, local oscillator and transmitter sections.

FIGS. 5–8 illustrate non-limiting examples of the type of circuit and board structure and interconnection among functional circuit components, including MMIC chips, which could be used in the present invention. Naturally, other circuit structures and designs could be used.

Figure 5:
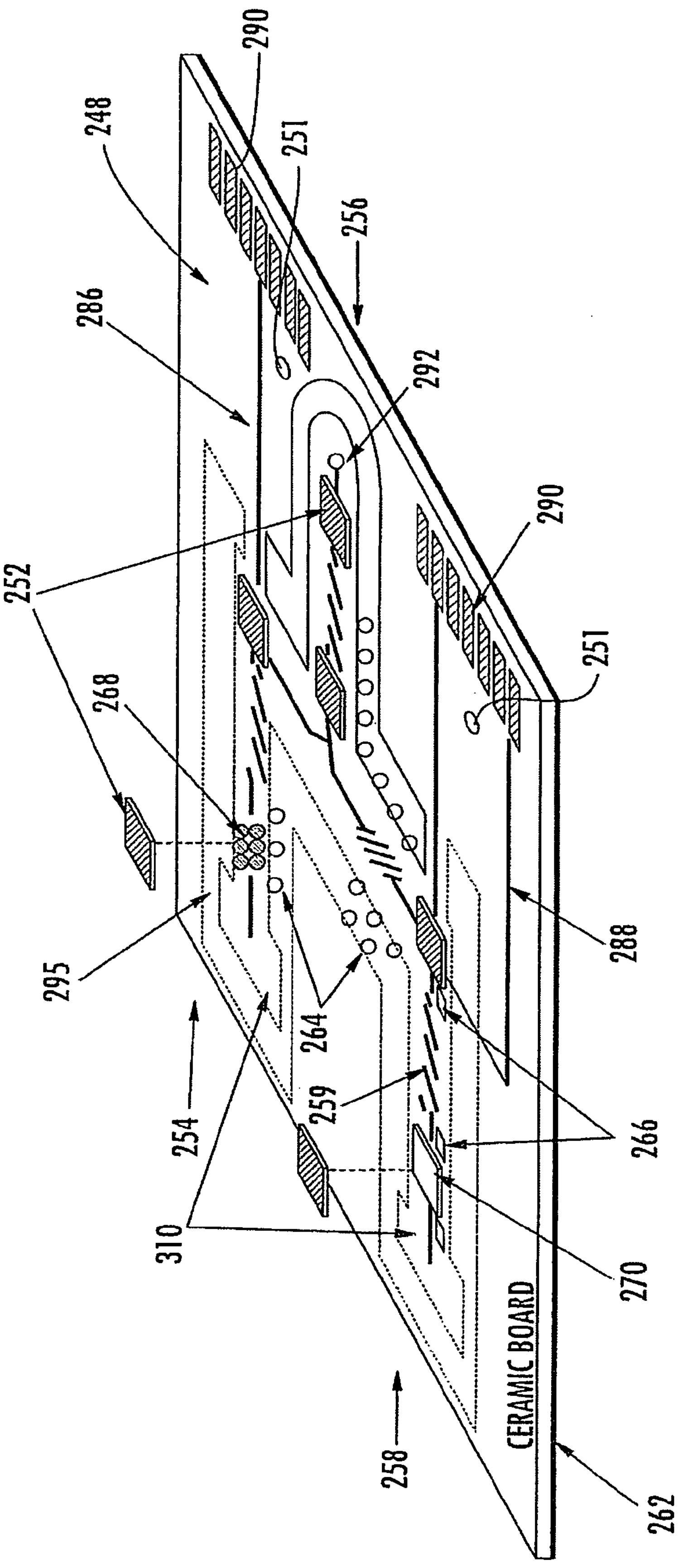
FIG. 5 is a fragmentary, generally isometric view of an example of a substrate board and components that could be used in the present invention and showing as an example high frequency microwave monolithic integrated circuit (MMIC) chips, filters, low cost surface mount components and the interconnection among these various components.
Figure 6:
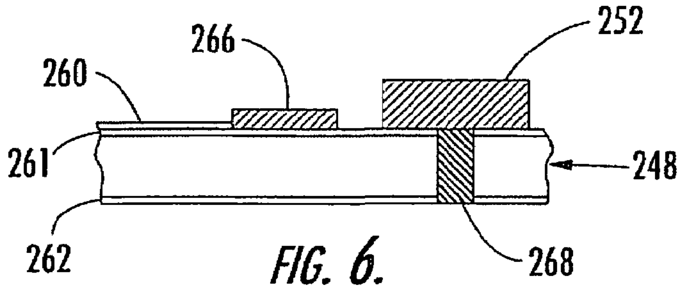
FIG. 6 is a fragmentary, sectional view of an example of a single layer substrate board that could be used with the present invention and showing RF circuitry, and an adhesion and RF ground layer.

As illustrated in FIG. 5, a plurality of microwave monolithic integrated circuit (MMIC) chips 252 are supported by the substrate board 248 formed preferably as a ceramic board, e.g., an alumina board, and arranged in a receiver circuit 254, a local oscillator circuit 256 and a transmitter circuit 258. A plurality of filters 259 and radio frequency interconnects are formed on the substrate board and operative with and/or connect the receiver, local oscillator and transmitter circuits 254, 256, 258. Any filters 259 and radio frequency interconnects 260 (FIG. 6) are preferably formed by thick film processing techniques, such as low temperature co-fired ceramic techniques, using methods known to those skilled in the art and are part of a top circuitry 261 (FIG. 6). A plurality of electrical interconnects are operative with and/or connect the receiver, local oscillator and transmitter circuits 254, 256, 258. In one aspect of the present invention, the electrical interconnects are printed on the substrate board as part of circuitry 261 (FIG. 6) using printing techniques (including thick film techniques if desired) as known to those skilled in the art.

This embodiment is shown in FIG. 5 with a single ceramic substrate board 248, and its top layer having the MMIC chip and RF interconnects (circuitry) 260 printed by thick film processing and/or other techniques thereon (FIG. 6). The bottom layer includes a radio frequency and ground layer 262 formed on the other side of the ceramic substrate board. The electrical interconnects (circuitry) associated with the RF interconnects (circuitry) and are typically printed on top as shown by the circuitry 261 in FIG. 6.

In another aspect of the present invention, at least one row of ground vias 264 are formed within this substrate board and provide isolation between at least the transmitter and receiver circuits 254, 258 formed on the substrate board. The vias 264 extend from the top portion of the substrate board through the substrate board to the radio frequency and ground layer 262. Ground vias 264 provide high isolation of greater than seventy (70) decibels between the transmitter and receiver chains in the transceiver modules. The vias 264 are typically spaced about a quarter of a wavelength apart and the via density can be adjusted based on isolation requirements. In areas where lower isolation is tolerated, a single row of ground vias 264 could be spaced approximately 0.4 wavelengths apart. In those areas where higher isolation is required, a second, offset row of vias could be used.

In another aspect of the present invention, the single, ceramic substrate board 248 can be formed from about 90% to about 100% alumina, and in one preferred embodiment, is about 95% or 96% to about 99% alumina. The board 248 can have different thicknesses ranging from about 5 to about 20 mil thick, and preferably about 10–15 mil thick, in one aspect of the present invention.

As shown in FIG. 5, high frequency capacitors 266 can be embedded on the top surface of the ceramic substrate board. The embedded capacitors eliminate the requirement for conventional and normally high cost, metal plate capacitors used with high frequency MMIC chips. It is possible to add a resistance material to the capacitor dielectric material and optimize the capacitor resonant frequency. Surface mount (SMT) capacitors can also be adhered by epoxy to the top surface of the ceramic substrate board for applications where the embedded capacitor values are insufficient to prevent oscillations.

It is also possible to form thermal heat sink (or possibly RF) vias 268 that are filled with conductive material under the MMIC chips to achieve adequate electrical performance and improved thermal conductivity as shown in FIGS. 5 and 6. These vias 268 extend from the MMIC chip to the radio frequency and adhesion ground layer 262. If the MMIC chip is still generating excessive heat, a cut-out 270, such as formed from laser cutters, can be made within the ceramic substrate board to allow direct attachment of the MMIC chip to a coefficient of thermal expansion matched carrier or heat sink, which could be part of the bottom plate.

Figure 7:
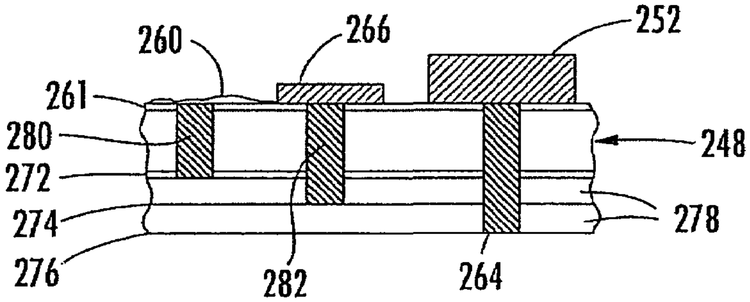
FIG. 7 is a fragmentary, sectional view of a substrate board that can be used with the present invention, which includes dielectric layers and conductive layers positioned on the substrate board.

FIG. 7 illustrates an embodiment where the ceramic substrate board 248 includes a radio frequency ground layer 272. A DC circuitry layer 274 and an adhesion ground layer 276 are separated from the ceramic substrate board by two dielectric layers 278, as illustrated. A radio frequency via 280 is operatively connected from the radio frequency circuitry 261 to the radio frequency ground layer 272. A DC via 282 is operatively connected from an embedded capacitor 266 on the top surface of the substrate board to the DC circuitry layer 274. A thermal via 268 is operatively connected from the MMIC chip 252 through the ceramic substrate board 248 and the two dielectric layers 278 to the adhesion ground layer 276.

FIG. 5 also illustrates a 50 ohm microstrip line 286 as formed as part of the RF circuit 261 and a DC signal trace line 288 formed as an electrical interconnect (circuit). The transmitter and receiver sections 254, 258 include a DC and intermediate frequency connection pad 290 that is operatively connected by a 50 ohm microstrip lines and DC signal trace to various MMIC chips as part of the receiver and transmitter circuits.

In some instances, any selected housing sections, such as the separator plate 64, housing/heat sink 62*a*, mid-section 64*a*, or cover 62*c*, could include an electromagnetic interference (EMI) gasket that is positioned on top of a ceramic substrate board (or other board) and around MMIC chips and supported by the ceramic substrate board when the housing assembly is secured. The ceramic substrate board 248 shown in FIG. 5 could also include an electromagnetic interference ground contact strip 295 that surrounds any transmitter, receiver and local oscillator circuits 258, 254, 256 and engages an interference gasket when the housing assembly is secured.

As illustrated in FIG. 5, the transmitter, receiver and local oscillator circuits 258, 254, 256 are formed substantially separate from each other to enhance isolation and reduce oscillations. Any portion of the housing assembly 62 could include a surface portion that includes formed radio frequency channels, for example, as shown with the separator plate 64 having channelization 64*a*. An electromagnetic interference gasket could be contained around any radio frequency channels, such that when the housing assembly is completed, the gasket is received and mounted around the receiver, transmitter and local oscillator circuits. It is also possible to include a radio frequency channel/echo absorbent material that is mounted within portions of the housing assembly 62 to improve isolation.

The radio frequency module layout could be channelized in sections to provide high isolation and prevent possible oscillations. Channel neck-down can be used in key areas to improve isolation. As shown in FIG. 5, the transmitter, receiver and local oscillator circuits 258, 254, 256 are formed relatively straight and narrow, as described before, and are positioned substantially separated from each other. This is especially applicable in high gain amplifier cascade applications.

Intermediate frequency, radio frequency and DC connections can transfer signals to and from the ceramic substrate board. The DC and intermediate frequency signals can be transferred in and out of a ceramic substrate board using pressure contact connectors, such as high frequency self-adjusted subminiature coaxial connectors (SMA) shown in FIGS. 9–13 of commonly assigned U.S. patent application Ser. No. 10/200,517, filed Jul. 22, 2002, the disclosure which is hereby incorporated by reference in its entirety.

Figure 8:
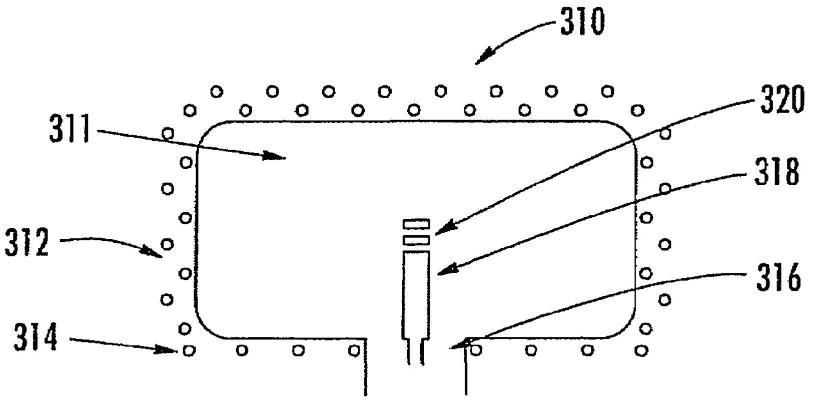
FIG. 8 is a fragmentary, plan view of a microstrip-to-waveguide transition that can be used in the present invention.
Figure 9:
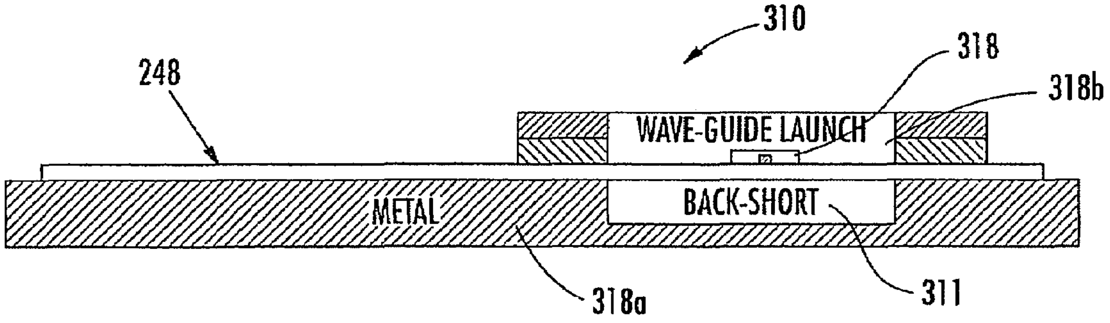
FIG. 9 is another fragmentary, plan view of a microstrip-to-waveguide transition that can be used in the present invention.

Radio frequency signals can be transferred in and out of signal traces, such as microstrip, on the ceramic substrate board using a broadband, low-loss, microstrip-to-waveguide transition 310 (FIG. 8) that could correspond to waveguide transitions 76, 78 of FIG. 2 for the transmitter and receiver circuit chains 42, 44, where no cuts in the ceramic substrate board are required to implement the transition. As shown in FIGS. 8 and 9, the transition 310 includes a channel or backshort 311 with a channel wall ground layer 312 formed thereon and ground vias 314. A reduced channel width feed 316 is operative with a microstrip probe section 318 and a tuning section 320 illustrated as a pair of elements.

FIG. 9 illustrates a fragmentary sectional view of the transition 310 and shows the ceramic substrate board 248 having a backshort 311, including a formed metal section 318*a* and a waveguide launch 318*b* as part of the probe section 318. Built-up sections such as formed from thick film processing techniques could be used for the structure. In one aspect of the present invention, the depth of the backshort can be a function of many things, including the dielectric constant of any material used for the substrate board and a function of the bandwidth that the system achieves. The backshort could typically be in the range of about 25 to 60 mils deep. The isolation vias, as illustrated, aid in the transition. The backshort can be formed on either side of the substrate board to facilitate assembly and reduce overall costs. If energy is to be propagated up into a waveguide, then the backshort would be placed on the bottom portion of the ceramic substrate board. Other components, as illustrated, could include a regulator controller board, DC connector and other component parts as necessary.

Figure 10:
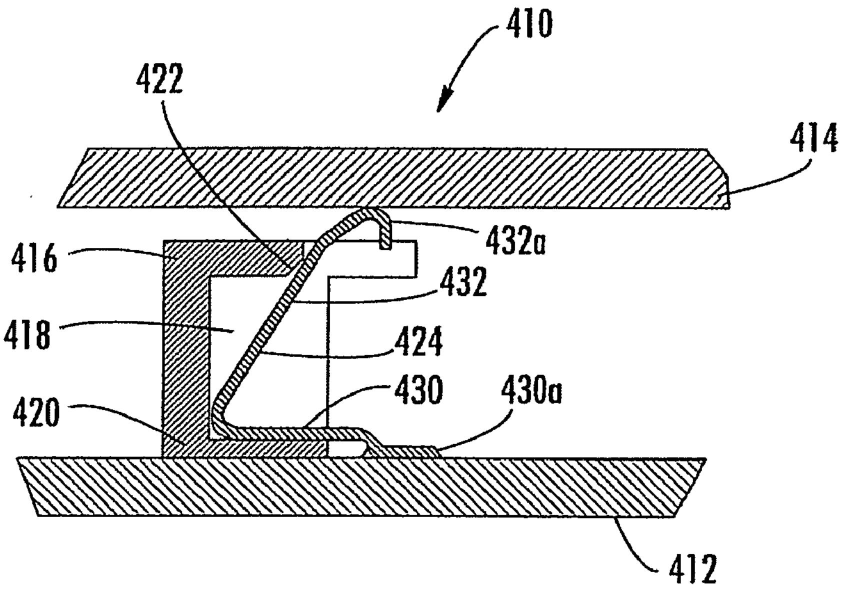
FIG. 10 is a fragmentary, sectional view of a surface mounted, pressure contact connector that can be used in the present invention and showing a connection between boards, such as a ceramic board and controller or "soft" board used in the present invention.
Figure 11:
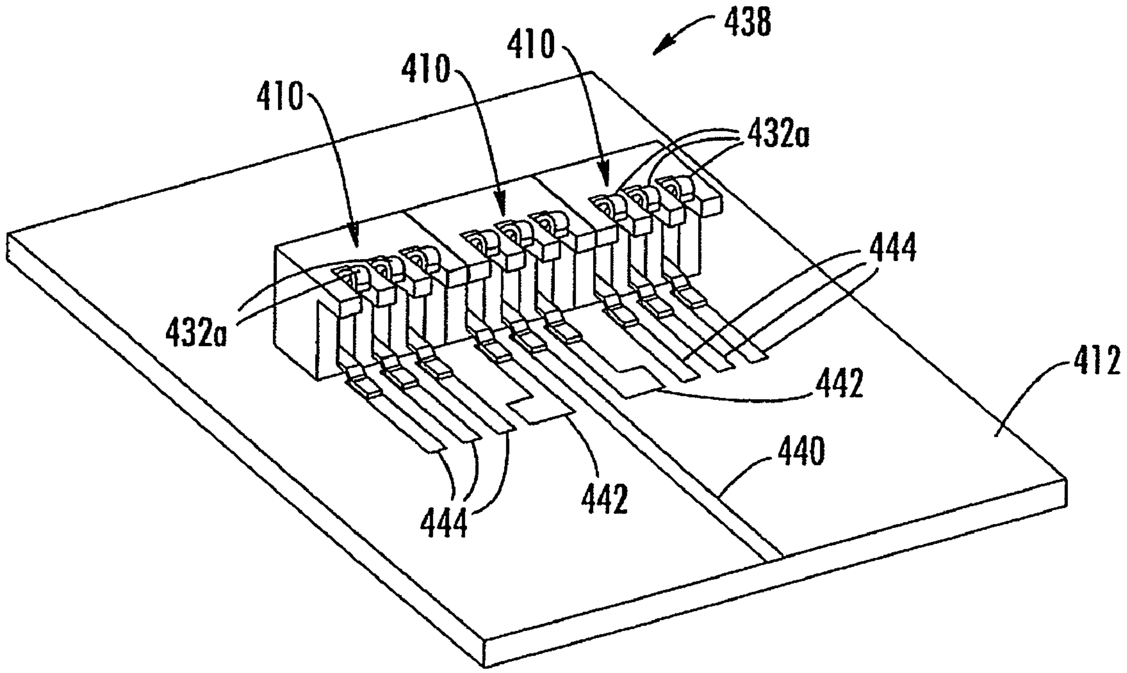
FIG. 11 is an isometric view illustrating a number of connectors such as that shown in FIG. 10 and positioned adjacent to each other on a first printed circuit board for forming a connection system where high frequency radio frequency signals, ground and DC signals can be transferred between overlying, cooperating boards such as a ceramic circuit board and a controller or soft board.

In the present invention, low frequency components are assembled on the controller or "soft" board 60 using traditional surface mount methods. The controller or "soft" board 60 could be formed from a Rogers board as manufactured by Rogers Corporation. A solderless contact connector could be positioned between a ceramic board forming the IF board 48 or RF band 50 and the low frequency, controller or "soft" board 60. An example of the type of connector that can be used with the present invention is shown in FIGS. 10 and 11 and described in commonly assigned U.S. patent application Ser. No. 10/224,622, the disclosure which is hereby incorporated by reference in its entirety.

FIG. 10 illustrates a portion of a surface mount, pressure contact connector 410 that would allow solderless connection between a ceramic board and a controller or "soft" board such as could be used in the present invention.

As shown in the fragmentary, partial sectional view of FIG. 10, the connector 410 can connect boards 412, 414, which could be respective ceramic and controller {or "soft") boards of the present invention, and connect circuits such as a microcontroller on the controller board and the MMIC chips on a ceramic substrate board. The connector 410 includes a housing member 416 having a clip receiving slot 418 (also referred to as a pin receiving slot) and a circuit board engaging surface 420 that is positioned against the ceramic substrate board 412.

Each housing member 416 could include three clip receiving slots 418 as illustrated in FIG. 11, where three housing members 416 are shown adjacent to each other. The housing member 416 is preferably formed from plastic and is substantially rectangular configured and includes a substantially flat, circuit board engaging surface that rests prone against the flat surface of the board. Each clip receiving slot 418 is formed as a rectangular cut-out and includes a shoulder 422 for engaging the electrically conductive clip members 424 as shown in FIG. 10.

Each clip member 424 is substantially v-shaped as shown in FIG. 10. The clip members 424 are small and can also be referred to as pins because of their small, spring-like and pin-like capacity to make "pin" connections. Each clip member 424 includes a first leg member 430 and end that engages the board 412. This end includes a drop down shoulder 430*a* that is soldered to a circuit trace or other circuit on the board 412. The upper portion of the first leg member 430 is received within the clip receiving slot 418. A second leg member 432 has an end that is spring biased against the board 414. The second leg member 432 includes a bent contact end 432*a* that forms what could be referred to as a "pin" or spring contact for engaging in a biased condition a circuit or trace on the board. The leg member 432 engages the shoulder 422 in the clip receiving slot to maintain a biasing force or "spring-action" of the clip member against the shoulder, while also maintaining a biasing force against the board 414 such that the pressure contact established by the bent end of the second leg member engages the circuit, trace or other connection point on the board 414. The boards can have metallized pads that align with the connector "pins" formed by the clip member 424.

In one aspect of the invention where a number of connectors 410 form a connection system 438 as shown in FIG. 2, a central clip member interconnects a radio frequency signal line 440 such as the common 50 ohm impedance radio frequency signal line, known to those skilled in the art. Adjacent clip members 424 (or pins) interconnect ground lines 442 positioned on the opposing side of the radio frequency signal line 440. Although only one ground pin per side is shown, the number of ground pins can be varied to increase isolation and improve return loss. Other adjacent clip members 424 (pins) connect DC and signal lines 444. Thus, the connector system 438 using the connectors 410 can transfer not only high frequency signals, but also ground connections and DC signals from one board 412 to the other board 414 via the clip members forming the spring-like pin connections.

In one aspect of the present invention, the spacing between the clip members (or pins) is about 40 mils and DC signals could be carried on other clip members in the same connector.

Typically, the various boards illustrated in FIG. 4 are stacked on top of each other with no fasteners, but use the separator plates or members, including the housing mid-section, as illustrated. Different housing assembly components can be formed from aluminum. Individual circuits within each board can be isolated using EMI gaskets that are attached to separator plates, such as the illustrated separator plate 64 adjacent the controller board 60, and to the housing mid-section 62*b*. Various cut-outs are formed in a plate or mid-section for use with the contact connectors. This method of board stacking eliminates the need for any costly wire harnesses and coaxial cables and reduces the amount of space required for any circuits. Because the boards are placed in close proximity to each other, the interconnect losses are reduced, therefore, requiring fewer circuits.

As the size of the mechanical package for the outdoor unit gets smaller, the requirement for thermal management becomes more critical. The present invention uses a microcontroller and three major techniques for managing thermal considerations. The present invention reduces the overall number of parts because the circuit design improvements allow a reduced number of parts. The present invention also provides adequate heat sinking for all hot components, such as by using the housing and heat sink member 62*a* as illustrated. The power supply is preferably mounted on a board closest to the housing/heat sink 62*a* to ensure proper heat transfer.

In the present invention, The frequency synthesizer board (or card) 54 can use a printed wiring board and can be made from a soft board material such as Rogers board. Each section of the design, including a voltage controlled oscillator, phase locked loop, filters, and multipliers can be isolated on the board through the use of through hole vias that provide unwanted signal and spurs propagation from one area of the board to the next, such as illustrated in FIG. 5. Isolation can be further improved by creating isolated areas within housing covers. An EMI gasket that is attached to the housing cover 62*c* and mid-section (functioning as a separator plate) could surround each isolated area as shown in FIG. 4. The EMI gasket can typically land directly on top of isolation vias on a board. This will be critical in achieving low phase noise in keeping a frequency synthesizer output free of spurious and harmonic signals.

The present invention also uses a dynamic thermal management process that is controlled by the on-board microcontroller that is mounted on the controller board. The microcontroller monitors the unit temperature using a temperature sensor or other sensors and adjusts any necessary radio frequency amplifier gate bias to minimize the amount of dissipated power for the desired transmitter output power as explained before, such as using a circuit similar to that of FIG. 3.

The outdoor unit 40 of the present invention allows the use of a single platform architecture for a wide operating frequency range. By changing the radio frequency (transceiver) circuit board 50 and the frequency synthesizer circuit board 54, different frequency bands can be transmitted and received. The housing assembly 62 and the intermediate frequency board 48 are common for all frequencies from 17 GHz to 60 GHz, since signals are up-converted and down-converted to a common intermediate frequency. Naturally the waveguide openings 62*d*, 62*e* in the housing cover 62*c* would vary in size depending on the desired operating frequency band as established by the selected boards that are inserted within the housing assembly. It is evident that the intermediate frequency board 48 is placed in the middle of the housing assembly between the housing mid-section 62*b* and the separator plate 64 with channelization.

Figure 12:
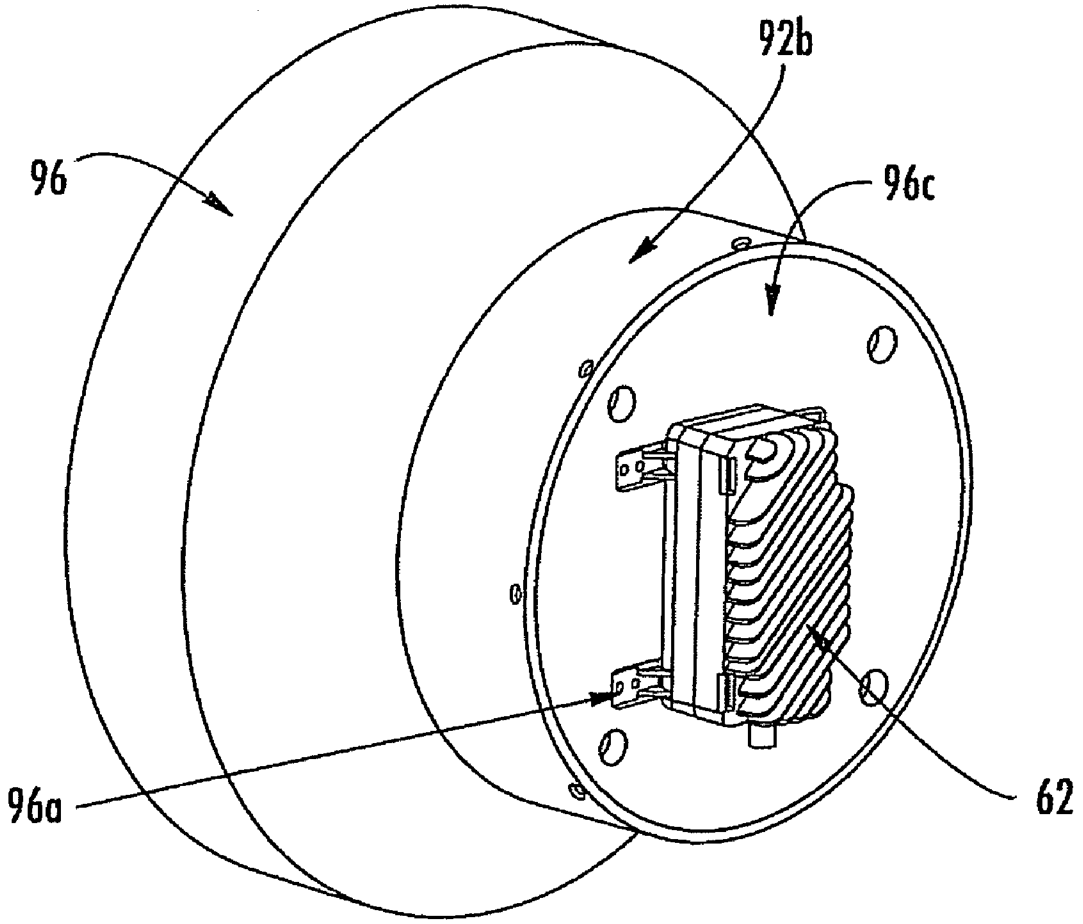
FIG. 12 illustrates the outdoor unit of the present invention mounted on an antenna.

The compact size of the outdoor unit also permits a lightweight design and enables the use of a universal standard interface with the antenna 96 that allows a quick connect/disconnect system as shown in FIG. 12. The interface with the antenna can be a simple plug and play system and use snap fasteners 96*a*, as shown in FIG. 5, with annular and circular base mounting plates 96*b*, 96*c* connected to the antenna. The transmitter and receiver waveguide ports 62*d*, 62*e* are operative with the various signal receiving and transmitting sections of the antenna for appropriate operation with the antenna.

In one aspect of the present invention, the telemetry between the outdoor unit and the indoor unit can be achieved using an on/off keying scheme that is transferred on the same cable as a transmitter intermediate frequency, receiver intermediate frequency, and DC signals as will be explained below.

For practical reasons, it is common in microwave communications equipment to locate the high frequency electronics very close to the microwave antenna. Since the antenna is most often mounted outdoors, the package of electronic equipment located with it is generally referred to as the “outdoor unit” or “ODU.” The signal transmitted or received is generally converted from/to a lower frequency called the “intermediate frequency” or “IF” that is more easily transmitted across longer distances over inexpensive coaxial cable. This cable is sometimes called the “IF cable.”

The IF cable is typically connected to modulator and/or demodulator equipment installed in a protected location. This equipment package is frequently called the “indoor unit” or “IDU.” If control signals are to be transmitted between the IDU and ODU, they must either be carried on separate wires (which increase the cost of installation) or be multiplexed onto the IF cable with the “payload” data, which poses significant technical challenges. Existing technologies to multiplex control signals onto an IF cable are either costly to implement or unable to support the data rate requirements of the system this invention was designed to support.

The present invention provides a new and superior method of multiplexing complex digital data signals onto the same cable as high frequency IF signals without interference. It can easily be implemented using interface hardware commonly built into many microcontrollers and microprocessors with a few additional low cost components.

Figure 13:
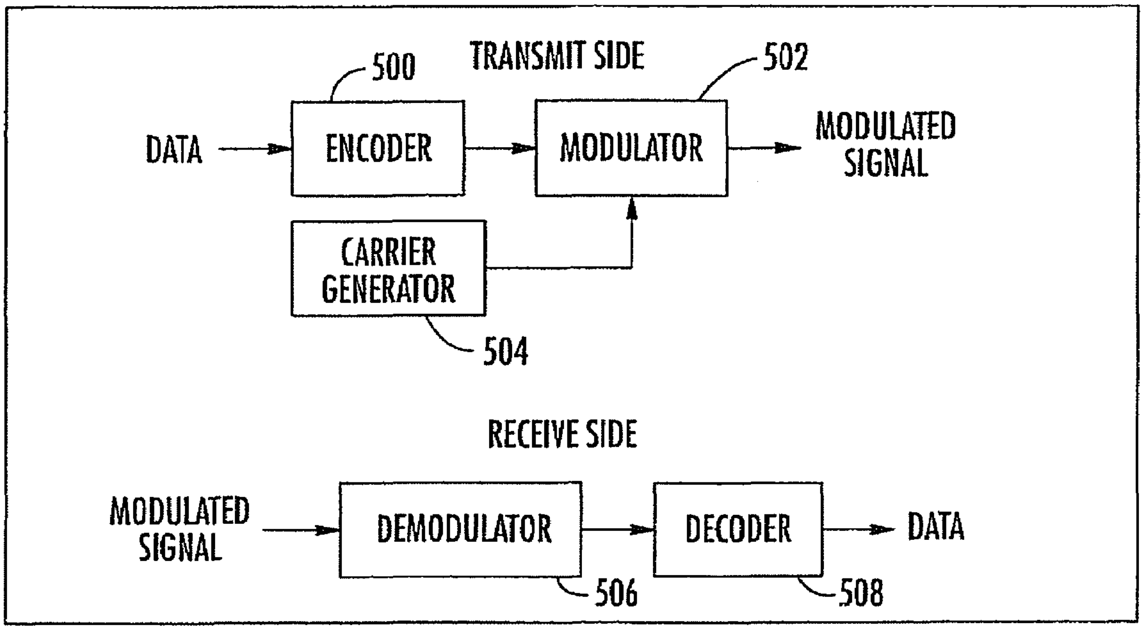
FIG. 13. (PRIOR ART)
FIG. 13 is a block diagram showing a prior art modulator/demodulator architecture.

As with the operation of many indoor units and outdoor units, data to be sent from one device (e.g., the IDU) to the other (e.g., the ODU) is encoded for transmission by an encoder 500 (FIG. 13). The resulting symbols are used to modulate (by modulator 502) a single-tone carrier generated by a signal generator 504. The carrier frequency is selected such that it does not interfere with other signals on the same wire circuit. On the receiving side, the signal is demodulated at a demodulator 506 and the symbols recovered, decoded at decoder 508, and used to recover the original data. This architecture is common to many RF modulated digital communications systems found in the prior art.

The present invention uniquely adds a non-invasive communications link in the presence of higher frequency spectra. In the industry where hardware size is constantly reduced, there are many signals that require connection between communications hardware. Increasingly, there is not enough physical space for all hardware and appropriate wiring connects. Also, the costs and budget to encompass the necessary hardware connections would be too great. The present invention transparently couples modulated, full duplex serial communication data on the same physical coaxial cable as higher frequency IF data spectra. The benefits of the present invention reduces the physical interfaces and consequently lower cost and mechanical complexity.

In a wireless communications application, including, but not limited to microwave terrestrial links and satellite communication terminals, such as VSAT terminals, it is desirable to mount RF transmit frequency hardware directly to the outdoor antenna 96, such as shown in the example of FIG. 12. The outdoor antenna 96 itself may be tower mounted. Modem, baseband, and IF hardware are typically located in another second location because of installation, maintenance, and environmental constraints. Physical connections must be made from this hardware to the RF transmit hardware located on or near the antenna. The RF unit is provided DC power, IF transmit and receive communications data, and control signals, to function properly. The telemetry circuit of the present invention accomplishes these functions over one physical connection, saving cost and mechanical complexity.

Figure 14:
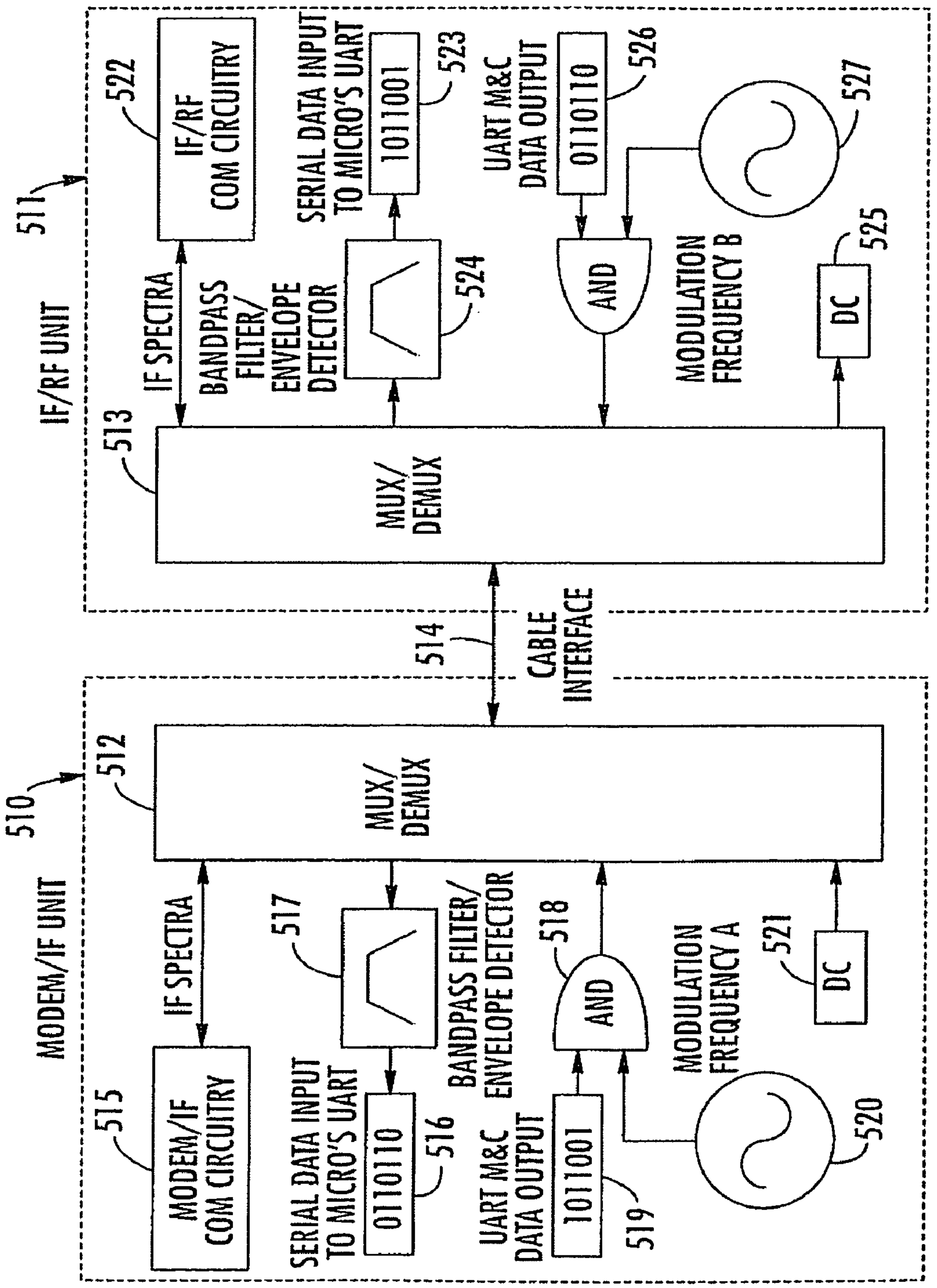
FIG. 14 is a block diagram showing the interconnection among various systems of the present invention for an indoor and outdoor unit.

A communication overlay system that can be used in the present invention could be considered to have five main parts: a multiplexer, a demultiplexer, a transmission cable, a serial data modulator, and a serial data demodulator. FIG. 14 illustrates a block diagram of an exemplary system showing how these systems are interconnected.

As illustrated, a modem/intermediate frequency (IF) unit 510 is shown on the left side and an intermediate frequency/radio frequency (RF) unit 511 is shown on the right side. Each unit includes a multiplexer/demultiplexer circuit 512, 513 and a cable interface 514 therebetween. Naturally, the two units correspond to an appropriate indoor unit and an outdoor unit of the present invention. Circuits as illustrated can be contained in the diplexer circuit of the present invention. The modem/IF unit includes a modem/IF communication circuitry 515 that is operative via the multiplexer/demultiplexer 512 with intermediate frequency spectra. A serial data input to microcontroller universal asynchronous receiver/transmitter (UART) circuit 516 is operative with a bandpass filter/envelope detector circuit 517. A logic circuit as an "AND" gate 518 is operative with the universal asynchronous receiver/transmitter monitoring and control (M&C) data output circuit 519 and a local oscillator circuit 520 that is operative at a first modulation frequency -A-. A DC power circuit 521 provides the DC power to various components.

The intermediate frequency/radio frequency unit 511 also includes an intermediate frequency/radio frequency communication circuitry 522 that is operative with the multiplexer/demultiplexer circuit 513 at intermediate frequency spectra. A serial data input to a microcontroller universal asynchronous receiver/transmitter circuit 523 is operative to receive data from a bandpass filter/envelope detector circuit 524. As in the other unit, the DC power circuit 525 provides power to associated components. A universal asynchronous receiver/transmitter monitoring and control (M&C) data output circuit 526 forwards data to an "AND" logic circuit 527 that also receives a local oscillator signal from a local oscillator 527 at a second modulation frequency -B-.

Each of the two units 510, 511 can use a full duplex serial communication scheme and the respective low frequency oscillators 520, 527, which are effectively clocked by a serial communication and control data output of each respective module. Each module also has a microprocessor or microcontroller with UART serial communication capability. The modulated monitoring and control (M&C) signal from circuits 519, 526 is stripped off in the de-multiplexer circuit portion of the multiplexer/demultiplexer 512, 513 into the narrow filter, followed by an envelope detector circuit to demodulate the input control and communication signals for the UART of the microprocessor. These frequencies are multiplexed with each other and with the IF spectra and filtered according to the methods described below to ensure operative transparency with respect to each other.

Figure 15:
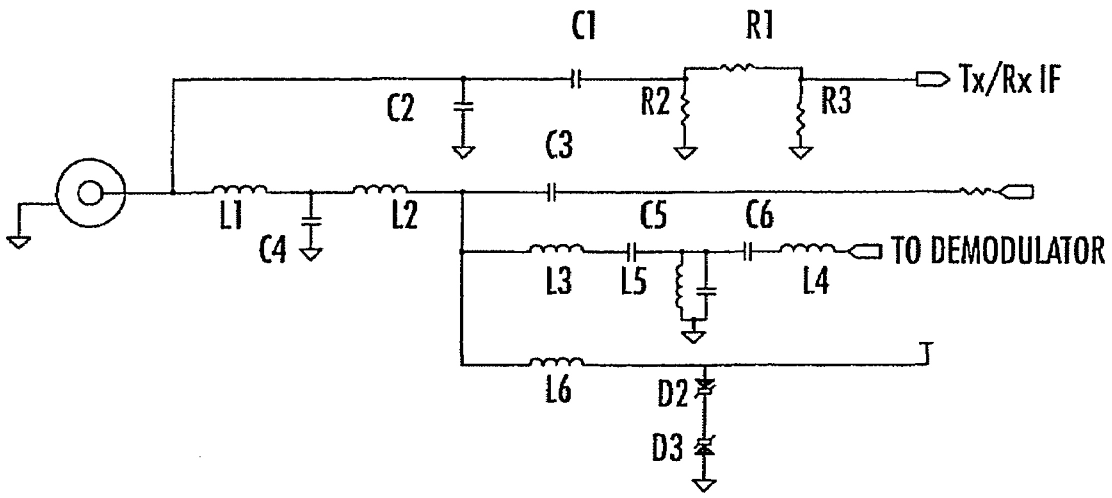
FIG. 15 is a schematic circuit diagram of a multiplexer/demultiplexer used in the present invention.

FIG. 15 shows an example of a schematic circuit that can be used for the design of the multiplexer/de-multiplexer circuit. The design of this circuit can be critical to the transparency of this frequency multiplexed system. DC and lower frequencies are first stripped off by low pass filtering from the physical cable. Higher frequency spectra of the transmit and receive IF signals are then filtered out individually and passed onto their respective component hardware. The lower frequency signals are fed into a narrow filter of the receive envelope detector. This filter will reject any noise or undesired signals including the transmit monitoring and control (M&C) frequency tones before passing on the receive data bit stream to the microprocessor's UART.

Figure 17:
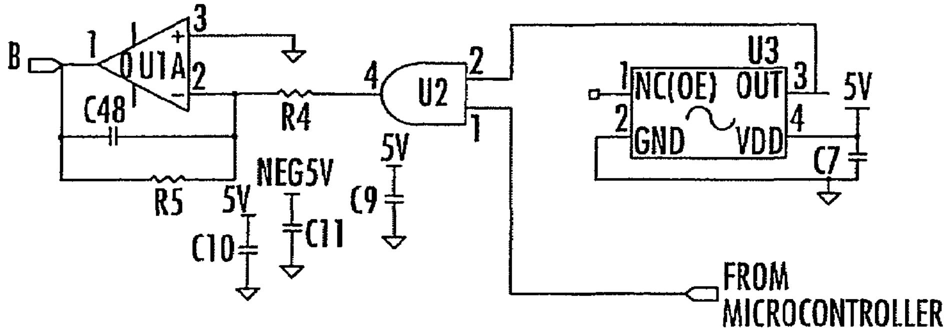
FIG. 17 is a schematic circuit diagram of the modulator of the present invention.
Figure 19:
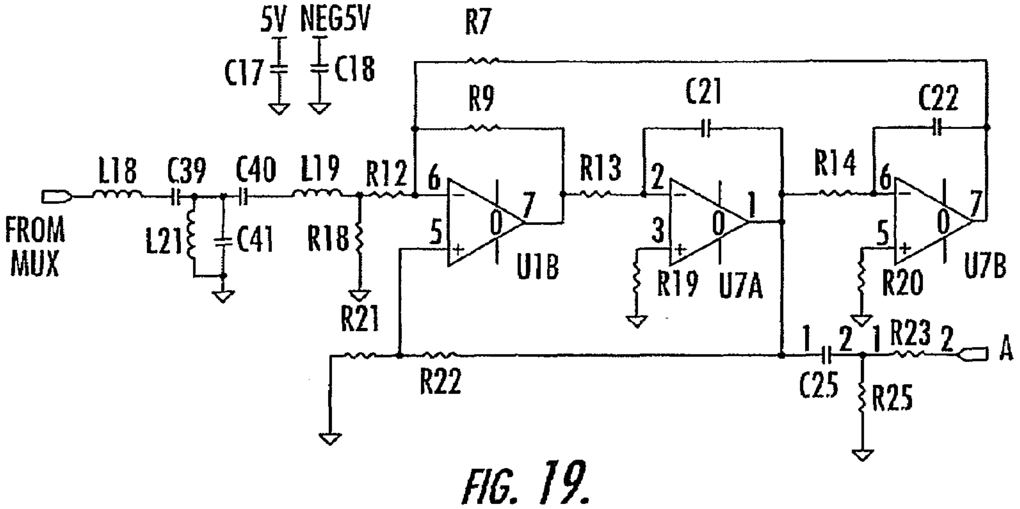
FIG. 19 is a schematic circuit diagram of a demodulator active filter that can be used in the present invention.
Figure 20:
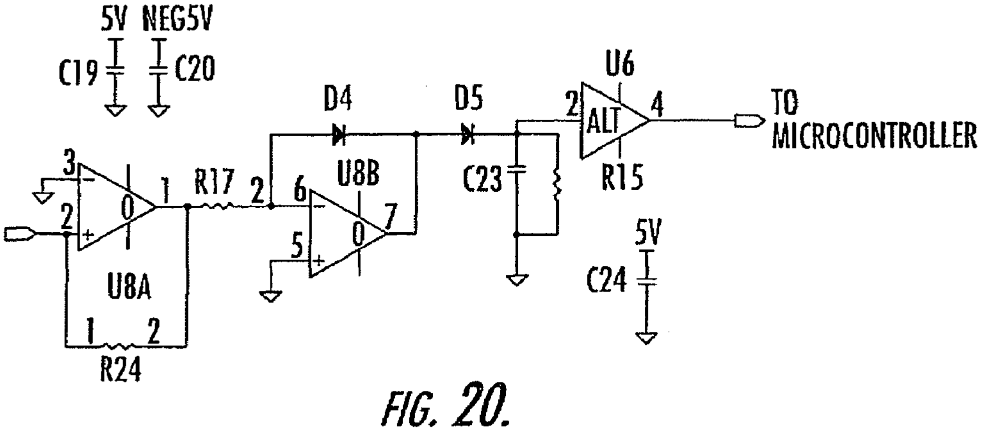
FIG. 20 is a schematic circuit diagram of the demodulator envelope detector that can be used in the present invention.

Examples of the modulator/demodulator circuits that can be used with the present invention are shown in FIG. 17 (modulator), FIG. 19 (demodulator, active filter design), and FIG. 20 (demodulator, envelope detector), and provide communication between the indoor and outdoor units. The telemetry signal is preferably, in this example, an on-off-keying modulated tone. The uplink frequency, as one non-limiting example, can be about 4.0 MHz, and the downlink frequency, as a non-limiting example, can be about 5 MHz.

As noted before, the circuit shown in FIG. 15 performs the function of multiplexing inputs and outputs onto a single cable. The wide bandwidth information is carried on the IF (intermediate frequency) signal, which is propagated through a simple high-pass circuit formed by C1, an impedance matching pad (R1–R3), and C2, a place holder for a performance tuning element. The IF signal is isolated from the telemetry and power supply signals by a low-pass filter, formed of elements L1, L2, and C4. The power supply input (DC) is separated from the telemetry signals by L6. The telemetry from the outdoor unit to the indoor unit is coupled through C3. The telemetry from the indoor to the outdoor units is filtered through the bandpass filter formed from L3–L5 and C4–C6, which provide approximately 12 to 15 dB of rejection for the telemetry from the outdoor unit to the indoor unit.

The encoding and modulation of the present invention applies an asynchronous encoding standard developed for short-distance baseband communication to modulated RF communication, using a single on-off-keyed carrier. Existing technologies for RF applications use either more sophisticated (and thereby more expensive to implement) encoding techniques, or use more complicated (and more expensive) modulation techniques, such as multi-frequency modulation or phase-shift keying.

As noted before, the circuit can be broadly organized into two sections: the encoder/decoder and the modulator/demodulator. An encoder takes "payload" data and adds extra information to it that aids in transmitting it accurately. The basic unit of encoded data is a logical "symbol." Different encoding schemes use different numbers of symbols in their symbol sets. Each symbol can represent several bits of raw data or less than one bit of raw data.

Each logical symbol in the set has a distinct electromagnetic representation. The modulator converts the logical symbols to electromagnetic representations that can be propagated without excessive distortion or damage that would make it impossible to distinguish one symbol from another.

A demodulator recovers the logical symbols from the electromagnetic representations. The symbols are then passed to the decoder, which uses the extra information added to the payload data to recognize the payload data and overcome damage that occurred to the signal in transit to recover the original payload data. Different methods of encoding and modulating digital data are appropriate for different transmission media and performance requirements.

In one aspect of the present invention for the encoding, data is encoded one 8-bit word at a time. The encoding can be based on a standard asynchronous encoding protocol such as commonly used by the National Semiconductor INS8250 UART (Universal Asynchronous Receiver Transmitter) as used in the original IBM PC. Compatible UART circuits can be found in virtually all computers and in many other devices. They are often used with a physical interface conforming to the RS-232 family for digital signaling at baseband frequencies (TIA/EIA-232F).

Each of the bits in an 8-bit word can be represented by one modulation symbol. Also, one or more extra symbols can be added at the beginning and end of a word. As known to those skilled in the art, these symbols are referred to as "mark" and "space." A binary data value of "1" is represented by a mark, and "0" can be represented by a space. When no data is sent, the encoder "rests" in the marking state.

At the beginning of a word of data, a space symbol is inserted to indicate that new data is being sent, which indicates that the data clock of the receiving unit is synchronized. The eight data bits are sent next (least significant to most significant) and optionally, a parity bit and up to two mark symbols as "stop bits."

Most microcontrollers and some microprocessors include dedicated hardware support for UART functionality, but a UART can be implemented in software if required. UARTs are also available as separate integrated circuits that interface with a microprocessor.

A UART's transmit section takes each byte of data and steps it out serially, adding the start symbol and whatever parity symbol and stop symbols are called for, at a specified symbol rate.

The UART's receive section detects the start symbol and reads each successive symbol at a time that is appropriate for the specified data rate. When all symbols in the group have been received, it discards the start symbol and any stop symbols and checks the parity symbol (if present) before discarding it. This leaves the original byte of transmitted data.

This invention can be used with a microcontroller that has UART hardware support. This can be considered the best practice for encoding and decoding the data, but implementations with IC UARTs and software encoding and decoding are equivalent.

In one aspect of the present invention for the modulation, the mark and space modulation symbols are used to switch "on" and "off" a carrier tone of a convenient frequency, with the carrier tone "on" representing "space" and the carrier tone "off" representing "mark." This technique is sometimes referred to as On-Off Keying (OOK). Thus modulated, the signal is bandpass filtered to keep it from interfering with other signals on the cable and can be transmitted on the shared cable. On the receiving end, a detector detects the modulated tone and converts it back to a standard logic-level signal, which is then passed to a UART to decode the original transmitted byte.

Figure 16:
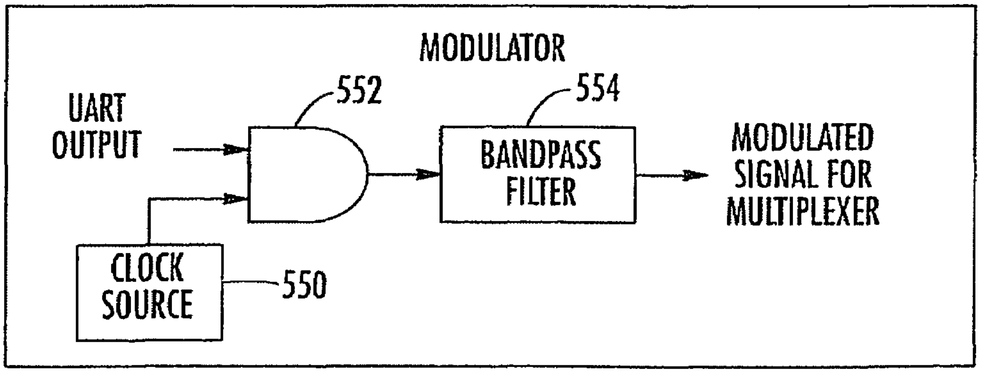
FIG. 16 is a block diagram of a monitoring and control modulator that accomplishes communication between the indoor (modem and IF hardware) and outdoor (IF translation to RF hardware) units.

The present invention implements the modulator with minimal cost and component count, as shown in FIG. 16, by combining the output of the UART with a clock signal from clock source 550 at the desired carrier frequency using an "AND" logic gate 552 as a "mixer" that switches on and off the clock/carrier. The gated clock signal is then passed through an analog bandpass filter 554 to remove the DC component and reduce the high frequency harmonics that would interfere with other signals for the modulated signal for the multiplexer. This is considered a better practice for the modulator architecture.

This block diagram of the modulation and control (M&C) modulator hardware shown in FIG. 16 accomplishes communication between the indoor (Modem and IF hardware) and outdoor (IF translation to RF hardware) units. As noted before, the telemetry signal is an on-off-keying modulated tone. The uplink telemetry frequency can be realized at about 4 MHz and the downlink telemetry frequency can be realized at about 5 MHz. FIG. 17 shows a detailed circuit design as an example of this system.

The data stream is the output of a standard serial UART. This provides channel coding, error detection, and timing recovery. The "marking" state of the UART should correspond to "tone on" and the "space" output state should correspond to "tone off." Full duplex data speeds of 19,600 baud have been realized.

The modulator can be as simple as using an "AND" gate to combine a clock signal at the transmit frequency with a data stream, which then passes the modulated square wave through a bandpass filter to strip away the high harmonics.

In FIG. 17, the crystal oscillator U3 generates a constant envelope, fixed frequency signal at about 4 MHz. The RS-232 port on the microcontroller would generate an actual data stream, which logic gate U2 uses to modulate the 4 MHz fixed frequency. Amplifier U1A and associated components would provide a buffered output capable of driving the modulated signal down the cable from the outdoor to the indoor units.

Figure 18:
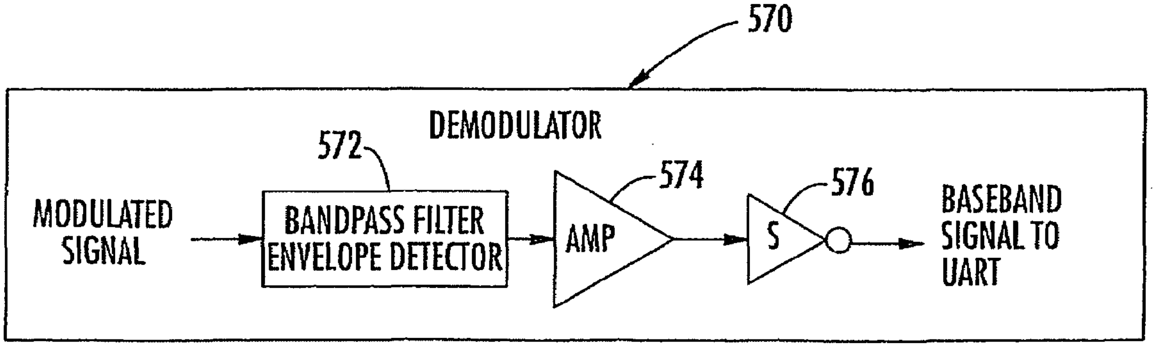
FIG. 18 is a block diagram of a demodulator of the present invention.

A low-cost demodulator 570 for the OOK signal can be built using a bandpass filter/envelope detector 572, an amplifier 574, and an inverter logic gate 576 with hysteresis, as shown in FIG. 18.

The demodulator, shown in FIG. 18, is easily implemented as a bandpass filter feeding a diode envelope detector, followed by a Schmitt-trigger inverter (amplifier). The inverter output is passed back to the UART. FIGS. 19 and 20 show examples of detailed schematic circuit designs that implement an active filter followed by a diode envelope detector that can be used with the present invention.

As shown in FIG. 19 for the demodulator active filter, there is another analog bandpass filter present, similar in structure to that previously noted, at the input to an active filter formed from amplifiers U1B and U7A and U7B, together with associated components. Resistor R18 provides a termination for the analog filter to allow proper filter shaping and minimization of ringing in response to a series of pulses.

In FIG. 20 for the demodulator envelope detector, amplifier U8A provides a buffer for the active filter previously described. Amplifier U8B, and diodes D4 and D5, provide rectification of the signal (if present), while R15 and C23 allow integration and a path to ground for any remaining high frequency components. The Schmitt trigger U6 "cleans-up" the output signal, reducing the pulse rise and fall times and supplies hysteresis as a functioning threshold detector. The data rate for the demodulator circuit may exceed 19.2 Kbaud, as dictated by the time constants of the detector and any buffering amplifiers.

As shown in FIG. 18, the OOK signal is fed into the envelope detector 572, which outputs the envelope of the modulated carrier. This output is passed through the high-gain amplifier 574 to level-shift the high values in the signal, then to a high-hysteresis (i.e. Schmidt trigger) logic inverter 576 to provide a clean logic-level output. Other demodulator architectures would also work, but the illustrated example as described is advantageous for use with the present invention because of its low cost and simplicity.

Full-Duplex Operation

This modulation scheme can be used for full-duplex data communication between two devices by assigning one device to transmit on a lower frequency and the other to use a higher frequency. A frequency selective circuit (bandpass filter) could be added before the envelope detector to prevent the unit from demodulating its own transmit signal. Since some systems use two different IF cables, full duplex communication can also be implemented by using one cable for each to transmit. This would allow both units to use the same frequency, but would work equally well with two different frequencies.

Half-Duplex Operation

When using this modulation scheme with a single carrier frequency only one unit can transmit at a time. In this case one unit must be designated the "master" and the other the "slave." Both devices would preferably use a carrier-off state as a marking state (i.e., a space is sent by turning the carrier on) so that the line is quiet when neither unit is transmitting data. In half-duplex mode, the "slave" unit only transmits data when interrogated by the "master" unit. The slave must wait a fixed (but essentially arbitrary) period of time after the master finishes transmitting before it sends its response.

Multi-Drop Operation

More than two devices can share the same line. As in standard half duplex mode, the circuit would include a master unit, but there would be multiple slaves. Each slave would have an address, and the master would send an address as part of the transmitted data. Only the slave unit whose address matches the address in the message would be allowed to respond. Multiple devices can also share the same line by using different frequencies of carrier as in standard full-duplex operation.

This application is related to copending patent application entitled, "SYSTEM AND METHOD FOR TRANSMITTING/RECEIVING TELEMETRY CONTROL SIGNALS WITH IF PAYLOAD DATA ON COMMON CABLE BETWEEN INDOOR AND OUTDOOR UNITS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A lightweight millimeter wave outdoor unit for mounting on an antenna to form a wireless link comprising:

a housing having a heat sink and a mounting member that is configured for quick connect/disconnect mounting on the antenna, said mounting member including transmit and receive waveguide ports;

a millimeter wave transceiver board formed of ceramic material mounted within the housing and having a millimeter wave transceiver circuit, including microwave monolithic integrated circuit (MMIC) chips and operable with the transmit and receive ports;

an intermediate frequency (IF) board mounted within the housing and having components forming an intermediate frequency circuit operable with the millimeter wave transceiver circuit;

a frequency synthesizer board mounted in the housing and having a signal generating circuit for generating local oscillator signals to the millimeter wave transceiver circuit;

a controller board mounted within the housing and having surface mounted DC and low frequency discrete devices thereon forming power and control circuits that supply respective power and control signals to other circuits on other boards;

wherein said RF transceiver board and IF board, said frequency synthesizer board, and said controller board are arranged in stacked configuration, and including surface mount circuit contact members that interconnect the circuits between the boards in the stacked configuration; and a quick connect/disconnect assembly operative with the housing for allowing the housing to be rapidly connected and disconnected to the antenna.

2. A millimeter wave outdoor unit according to claim 1, wherein said quick connect/disconnect assembly comprises snap fasteners.

3. A millimeter wave outdoor unit according to claim 1, and further comprising a housing separator member that separates the respective transceiver and controller boards and having channelization and at least one electromagnetic interference gasket to aid in isolating any circuits on a board.

4. A millimeter wave outdoor unit according to claim 1, wherein said intermediate frequency circuit is operable to receive low frequency transmitter signals from a modem in an indoor unit and up-convert the signals to an intermediate frequency and amplify the signal, and receive an intermediate frequency signal from the millimeter wave transceiver board and down-convert to a lower frequency prior to transmission to an indoor unit.

5. A millimeter wave outdoor unit according to claim 1, and further comprising a transmit and receive microstrip-to-waveguide transition formed on the millimeter wave transceiver board and operable with respective transmit and receive waveguide ports.

6. A millimeter wave outdoor unit according to claim 1, wherein said housing member further comprises a cover on which the waveguide ports are formed.

7. A millimeter wave outdoor unit according to claim 1, wherein said frequency synthesizer board is mounted in a floating non-mechanically attaching interface allowing relative movement and coefficient of thermal expansion mismatch and reducing phase hits.

8. A millimeter wave outdoor unit according to claim 1, wherein said controller board is mounted to engage said heat sink.

9. A millimeter wave outdoor unit according to claim 1, wherein the millimeter wave transceiver board is mounted adjacent and planar end-to-end with the intermediate frequency board.

10. A millimeter wave outdoor unit according to claim 1, wherein said circuit contact members each comprise a housing member having a clip receiving slot and board engaging surface and at least one electrically conductive clip member having opposing ends received within the clip receiving slot wherein an end of the clip member is secured to a circuit on one board and the other end biased into connection with a circuit on another board.

11. A millimeter wave outdoor unit according to claim 1, and further comprising a microcontroller mounted on the controller board and operatively connected to at least one MMIC chip and operative for controlling transceiver gain and output power.

12. A millimeter wave outdoor unit according to claim 11, wherein said microcontroller is responsive to sensed temperature.

13. A millimeter wave outdoor unit according to claim 1, wherein said transceiver board is operable at select frequency bands and readily removable from the housing to allow replacement with a transceiver board that is operable at different frequency bands.

14. A millimeter wave outdoor unit according to claim 1, wherein said controller board is formed from PTFE composite material.

15. A lightweight millimeter wave outdoor unit for mounting on an antenna to form a wireless link comprising:

a housing that is configured for quick connect/disconnect mounting on the antenna;

a millimeter wave transceiver board formed of ceramic material and mounted within the housing;

a transceiver circuit formed on the millimeter wave transceiver board and having transmit and receive circuits and a local oscillator circuit and a plurality of microwave monolithic integrated circuit (MMIC) chips mounted on the transceiver board in at least transmit and receive circuits and operable at radio frequency;

an intermediate frequency (IF) board mounted within the housing and having components forming an intermediate frequency circuit operable with the transceiver circuit and operable for receiving and forwarding signals to an indoor unit (IDU);

a frequency synthesizer board mounted within the housing and having surface mounted components forming a signal generating circuit for generating local oscillator signals to the transceiver circuit;

a controller board mounted within the housing and having surface mounted DC and low frequency discrete devices thereon forming power and control circuits that supply respective power and control signals to other circuits on other boards;

wherein said RF transceiver board and IF board, said frequency synthesizer board, and said controller board are arranged in stacked configuration, and including surface mount circuit contact members that interconnect the circuits between the boards in the stacked configuration; and a plurality of housing separator members that separate respective transceiver, controller and frequency synthesizer boards and having channelization and at least one electromagnetic interference gasket to aid in isolating any circuits on a board.

16. A millimeter wave outdoor unit according to claim 15, wherein said intermediate frequency circuit is operable to receive low frequency transmitter signals from a modem in an indoor unit and up-convert the signals to an intermediate frequency and amplify the signal, and receive an intermediate frequency signal from the millimeter wave transceiver board and down-convert to a lower frequency prior to transmission to an indoor unit.

17. A millimeter wave outdoor unit according to claim 15, and further comprising a transmit and receive waveguide port formed on the housing and a transmit and receive microstrip-to-waveguide transition formed on the transceiver board in the transmit and receive circuits and operable with respective transmit and receive waveguide ports.

18. A millimeter wave outdoor unit according to claim 15, wherein said housing further comprises a cover on which the waveguide ports are formed.

19. A millimeter wave outdoor unit according to claim 18, wherein said frequency synthesizer board is mounted between the cover and a housing separator member in a floating non-mechanically attaching interface allowing relative movement and coefficient of thermal expansion mismatch and reducing phase hits.

20. A millimeter wave outdoor unit according to claim 15, wherein said housing includes a heat sink and said controller board is mounted to engage said heat sink.

21. A millimeter wave outdoor unit according to claim 15, wherein the millimeter wave transceiver board is mounted adjacent and planar end-to-end with the intermediate frequency board.

22. A millimeter wave outdoor unit according to claim 15, wherein said circuit contact members each comprise a housing member having a clip receiving slot and board engaging surface and at least one electrically conductive clip member having opposing ends received within the clip receiving slot wherein an end of the clip member is secured to a circuit on one board and the other end biased into connection with a circuit on another board.

23. A millimeter wave outdoor unit according to claim 15, and further comprising a microcontroller mounted on the controller board and operatively connected to at least one MMIC chip and operative for controlling transceiver gain and output power.

24. A millimeter wave outdoor unit according to claim 23, wherein said microcontroller is responsive to sensed temperature.

25. A millimeter wave outdoor unit according to claim 15, wherein said transceiver board and frequency synthesizer board are operable at select frequency bands and readily removable from the housing to allow replacement with a transceiver board and frequency synthesizer board that are operable at different frequency bands.

26. A millimeter wave outdoor unit according to claim 15, wherein each of said controller and frequency synthesizer boards is formed from PTFE composite material.

27. A lightweight millimeter wave outdoor unit for mounting on an antenna to form a wireless link comprising:

a housing that is configured for quick connect/disconnect mounting on the antenna;

a millimeter wave transceiver board formed of ceramic material mounted within the housing and having a millimeter wave transceiver circuit including microwave monolithic integrated circuit (MMIC) chips;

an intermediate frequency board;

a frequency synthesizer board having a surface mounted signal generating circuit for generating local oscillator signals to the transceiver circuit; and a controller board having surface mounted DC and low frequency discrete devices thereon forming power and control circuits that supply power to the transceiver circuit and signal generating circuit, wherein the millimeter wave transceiver board, intermediate frequency board, frequency synthesizer board and controller board are positioned in stacked configuration within the housing and including surface mount contact connectors each having at least one circuit contact connection that connects circuits of two boards.

28. A millimeter wave outdoor unit according to claim 27, wherein the controller board is formed from a PTFE composite material.

* * * * *